(12) United States Patent
Yamamoto et al.

(10) Patent No.: US 6,726,367 B2
(45) Date of Patent: Apr. 27, 2004

(54) ROLLING APPARATUS

(75) Inventors: Toyohisa Yamamoto, Kanagawa (JP);
Norifumi Ikeda, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/820,867

(22) Filed: Mar. 30, 2001

(65) Prior Publication Data

US 2001/0036328 A1 Nov. 1, 2001

(30) Foreign Application Priority Data

| Mar. 30, 2000 | (JP) | ................ 2000-095062 |
| May 31, 2000 | (JP) | ................ 2000-161336 |
| Jan. 24, 2001 | (JP) | ................ 2001-015492 |

(51) Int. Cl.⁷ ............................................. F16C 19/00
(52) U.S. Cl. ........................................ 384/463; 384/477
(58) Field of Search .................. 384/462, 463, 384/477

(56) References Cited

U.S. PATENT DOCUMENTS

| 5,728,020 A | * | 3/1998 | Muranaka et al. | ........... 384/462 |
| 5,915,844 A | * | 6/1999 | Nanbu et al. | ................ 384/462 |
| 5,961,222 A | * | 10/1999 | Yabe et al. | ................ 384/476 |
| 6,164,832 A | * | 12/2000 | Daughtry | .................... 384/462 |
| 6,214,774 B1 | * | 4/2001 | Nozaki et al. | .............. 384/397 |
| 6,228,813 B1 | * | 5/2001 | Yabe et al. | ................ 384/463 |
| 6,296,393 B1 | * | 10/2001 | Yabe et al. | ................ 384/463 |
| 6,329,326 B1 | * | 12/2001 | Iso et al. | ..................... 384/462 |

* cited by examiner

Primary Examiner—Jack Lavinder
Assistant Examiner—Devon Kramer
(74) Attorney, Agent, or Firm—Sughrue Mion, PLLC

(57) ABSTRACT

A rolling bearing 1 comprises a inner ring 2 (as a movable member), an outer ring 3 (as supporter) for supporting the inner ring 2, and a plurality of rolling elements 4 disposed between the inner ring 2 and the outer ring 3. The rolling element are rotated in accordance with the rotation of the inner ring 2. The rolling bearing is to be located in the vicinity of a heat source. The outer ring 3 located nearer to the heat source than the inner ring 2 is composed with a material of a heat conductivity being 40 W/m·K or less.

9 Claims, 10 Drawing Sheets

ROLLING APPARATUS

BACKGROUND OF THE INVENTION

The present invention relates to a rolling apparatus having low heat conductivity, in particular to such a rolling apparatus to be used to systems transporting within furnaces at high temperatures such as ceramic kiln cars, conveyors for continuously heating treatment or paint baking trolleys, otherwise to usage under conditions where heat is conducted to the rolling apparatus via a housing or a shaft from a heat source outside of the rolling apparatus as an iron-steel equipment, resulting to have high temperatures (hereafter called as "the rolling apparatus used in the vicinity of the heat source").

The invention also relates to a rolling bearing for supporting a main shaft of a motor of air blowing fan used as a cooling fan of micro processor (IC, MPU) to be incorporated into air conditioning fans, ventilating fans, personal computers or servers (hereafter called as "the rolling bearing for fan motor").

Further, the invention relates to a rolling bearing to be suitably used to copiers (PPC: white-black, color, analog, digital or other kinds), laser beam printer (LBP), facsimile (FAX), or office machinery such as compound machines of them (hereafter called as "the rolling bearing for office machinery").

In the rolling bearing, members as a movable member, a supporter and rolling elements are composed with metallic members as steel. At the interior of the rolling bearing, a lubricant as a grease is circulated or charged for effecting lubrication. Such rolling bearings are used without any problems under ordinarily using conditions.

On the other hand, in the systems transporting within furnaces at high temperatures such as ceramic kiln cars, conveyors for continuously heating treatment or paint baking trolleys, as the inside of the furnace is at high temperature, the heat is conducted mainly from the housing, that is, from the outer ring into the inside of the rolling bearing to heighten temperatures thereof. The inner ring, outer ring, and rolling elements are mainly composed with a steel for bearing (SUJ2).

As motors of cooling fans of micro processors to be incorporated in personal computers or servers are demanded to be small sized or quiet, a so-called brushless DC motor is employed, where a rotor is furnished with a permanent magnet and an electromagnetic field is formed by the core and coil of a stator to rotate the rotor. In motors for air blowing of a middle sized type, AC motor by an inverter control is used, and also similarly to the above, the electromagnetic field is formed at the stator side to rotate the rotor.

Such rolling bearings for fan motor are structured with a duplex bearing effected with a normal position or constant load—pre load for securing rigidity of a main shaft. In the rolling bearing, a bearing ring and rolling elements are composed with a bearing steel or heat resistant steel, and a holder is a metal-made press holder, and in particular, for the small sized bearing, resin-made crown holder is used. In these bearing units, depending on attachment of the rotor, there are cases of the outer ring rotating and the inner ring rotating.

The office machinery such as copiers, LBP, FAX or these compound machines has been demanded to have more advanced high performance (heightening the treating speed per sheet of paper) and to be more compact. The office machinery has always been demanded to be improved as such. For satisfying these requirements, the rolling bearing used at a sheet sending part of the office machinery has been more reduced in size, faster working conditions and trended to be higher load.

Especially, the rolling bearing used to heat rolls at a toner fixing part or pressure rolls is worked at high temperatures as 200 to 250° C., since a step of using the rolling bearing heats to fuse a toner on a sheet to fix thereon, and the working conditions are more severer (parts other than the toner fixing part are at 100 to 150° C.).

The rolling bearing used to heat rolls at the toner fixing part or the pressure rolls has been demanded to be lower in a consumed energy when the rolling bearing is rotated, that is, to be low torque of the rolling bearing for saving the energy.

Besides, as recycling use of units of the heat roll parts has been advanced for curtailing resources, the rolling bearing used therefor is requested to be a longer life under circumstances at high temperatures.

In addition, it has been required for the heat roll to have characteristic less to escape heat at high temperature outside therefrom for saving the energy.

At first, explanation will be made to problems of the prior art rolling bearing used in the vicinity of the heat source as transporting systems within furnaces at high temperatures or the iron-steel equipment.

The inner rings, outer rings and rolling elements of the rolling bearings as above are often composed with a steel for bearing (SUJ2) having high heat conductivity as 50 W/m·K. Therefore, in case the rolling bearing is disposed nearly to the heat source, the heat therefrom is easy to conduct to the interior of the rolling bearing, and in particular, either near to the heat source of the inner ring and the outer ring, that is, saying in the above example, the temperature of the outer ring faster goes up.

Accordingly, there were risks that a lubricant existing on the raceway surface of the outer ring (for example, silicone grease or fluorine based grease) was oxidized and worsened in a short time, separated an oil content or dissolved, so that the lubricity of the lubricant was deteriorated to extremely shorten the life of the rolling bearing.

Next reference will be made to problems involved with the conventional rolling bearing for fan motors.

Recently, accompanied with miniaturization of electric or electrical machinery, the miniaturization has been progressed also as to fans for internal cooling or blowing air. Particularly, as microprocessors to be incorporated in personal computers, servers or the like also increase heating values together with heightening of calculation processing speed, the cooling fans to be used in this technical field have been demanded, together with the miniaturization, to increase an air quantity and to lower the air blowing temperature.

An air blowing capacity of the fan is determined by the size and rotation number of the fan, and for increasing the air blowing capacity while miniaturizing the size, it is necessary to increase the rotor rotation number of the motor.

In air blowers of air conditioners, the fan has been advanced to have a high output for realizing rapidly cooling or warming. For these fan motors, AC motors by the inverter control are employed, but for making the high output, a carrier frequency from an inverter electric source should be made high frequency.

However, if the electric energy to be supplied to the stator is increased by making the high speed rotation (heightening the rotation number) and the high output of the fan motor, the heat value becomes large, which is generated in the coil or core forming the magnetic field of the stator. Then, if, like the conventional rolling bearing, the composing members of the rolling bearing for supporting a main shaft of the fan motor are fabricated with such materials having high heat conductivity as bearing steels, the heat occurring in the stator is easily transmitted to the rotor to heighten the temperature of the fan. So, although the air quality is increased, the air blowing temperature goes up, so that the increase of the fan cooling effect is probably hindered.

Since the temperature of the rolling bearing itself also goes up, the viscosity of the lubricant charged in the rolling bearing goes down to cause bad lubricity, and therefore if a bearing ring and rolling elements are both composed with a metal, there appear problems of adhesion or fine seizure to bring about a deterioration in the acoustics in the bearing in an early period of service.

Problems with the conventional rolling bearings for office machinery will be explained.

The reduction in size, high speed of serving conditions, high load or high temperature of the conventional rolling bearings make it difficult to form an oil film of the lubricant at the contacting face between the rolling elements, movable member and supporter of the rolling bearing, and trend to lower the lubrication.

Therefore, under such severe conditions, the lubricity is insufficient in the conventional rolling bearing, and by the use for a relatively short time, the torque of the rolling bearing is remarkably increased and is probable to generate seizure owing to abrasion. Thus, in the rolling bearing used to the office machinery of high performance and reduction in size, there is a first problem that the conventional rolling bearing is not suited.

With respect to the rolling bearing used to the heat rolls at the toner fixing part or the pressure rolls, because of the usage under high temperature for the reasons stated in the paragraph of the prior art technique, the request for being at the low torque for saving the energy, and the request for having the long service life under the high temperature aiming at the recycle use saving the resources, the application of the conventional rolling bearing is more difficult (a second problem).

In the rolling bearing used to heat rolls at the toner fixing part or the pressure rolls, it is often use the fluorine grease having the base oil of kinematic viscosity being relatively large at normal temperature (40° C.), taking heat resistance and lubricity at high temperature into consideration. However, there is a problem that since the fluorine grease has the high viscosity, the torque becomes large when rotating the rolling bearing, and the energy (electric power) is consumed.

In addition, as stated in the paragraph of the prior art, the heat roll has been required to have characteristic less to escape heat at high temperature outside therefrom for saving the energy. However, as the rolling elements, movable member and supporter of the conventional rolling bearing are composed of metallic materials having the excellent heat conductivity, there arises a third problem that the heat heightened for fixing the toner escapes outside from the heat roll through the rolling bearing used to the heat roll, and the energy (electric power) for heating is more consumed.

SUMMARY OF THE INVENTION

Thus, the invention has a first theme of solving the problem involved with the prior art rolling bearing to be used in the vicinity of the heat source, and of making the heat from the heat source difficult to conduct the interior of the rolling bearing, aiming at providing the rolling bearing of a long serving life.

The invention has a second theme of solving the problem involved with the prior art rolling bearing for fan motors, and of having no probability of hindering increase of the cooling effect of the fan in spite of high speed rotation and high output of fan motors, aiming at providing the rolling bearing for fan motors having excellent quietness for a long period of service.

The invention has a third theme of solving the above mentioned third problem among the problem points of the rolling bearing for the office machinery, and decreasing heat radiation from the heat roll, aiming at providing the rolling bearing enabling to make the office machinery save the energy.

For solving the above first theme, the invention has the following structure. The rolling apparatus according to the invention, which is provided with a movable member enabling rotation or linear motion, a supporter for supporting the movable member, and a plurality of rolling elements disposed between the movable member and the supporter for rolling together with the rotation or the linear motion of the movable member, and located in the vicinity of a heat source, is characterized in that at least the rolling elements, or either of the movable elements and the supporter which either is nearer to the heat source, or either of the movable elements and the supporter which either is nearer to the heat source and the rolling elements are fabricated with a material of a heat conductivity being 40 W/m·K or less.

Being such a structure, the heat conduction of the heat source from either of the movable elements and the supporter which either is nearer to the heat source is effectively controlled, that is, the heightening of the temperature per unit time is effectively controlled. As a result, the lubricant charged within the rolling apparatus (a later mentioned grease) or the lubricant treated on the surface of the interior (such as a solid lubricant film) can be effectively prevented from deterioration owing to the high temperature (oxidation, decomposition, or oil separation).

Accordingly, a long life can be maintained even under the using condition where the heat source is present outside of (in the vicinity of) the rolling apparatus, and the heat is transmitted through the housing or the shaft to increase the temperature of the rolling apparatus.

For providing the effects as mentioned above, it is necessary that at least the rolling elements, or either of the movable elements and the supporter which either is nearer to the heat source, or either of the movable elements and the supporter which either is nearer to the heat source and the rolling elements are fabricated with the material of the heat conductivity being 40 W/m·K or less, provided that, for exhibiting the above effects more sufficiently, the heat conductivity is preferably 35 W/m·K or less, more preferably 30 W/m·K or less.

If the rolling elements are fabricated with a material of the heat conductivity being 40 W/m·K or less, more preferably 35 W/m·K or less, still more preferably 30 W/m·K or less together with either of the movable elements and the supporter which either is nearer to the heat source, the above mentioned effect may be exhibited more satisfactorily.

With respect to materials for fabricating either of the movable elements and the supporter which either is nearer to the heat source or the rolling members, as far as satisfying the condition of the heat conductivity, no limitation is especially provided.

For example, stainless steels as SUS440 or some sorts of ceramic materials may be listed up, and as the ceramic materials, there are exemplified silicone nitride ($Si_3N_4$), zirconia ($Zr_2$), alumina ($Al_2O_3$), boron carbide ($B_4C$), boron nitride (BN), titanium carbide (TiC), titanium nitride (TiN), or ceramic based materials where two or more sorts of these substances are compounded.

The ceramic materials for the invention improve fracture toughness or mechanical strength, and therefore may be mixed with fibrous filling materials. Fibrous filling materials are not especially limited in sort, and whisker of silicone nitride or alumina whisker may be taken up as examples.

The invention is available to not only the rolling bearing, but also the rolling apparatus such as linear guide apparatus, ball screws, or linear motion bearings. In case the rolling apparatus is a linear guide apparatus, a slider corresponds to the movable member, and a guide rail corresponds to the supporter. In case the rolling apparatus is a ball screw, a nut corresponds to the movable member, and a screw shaft does to the supporter. In addition, in case the rolling apparatus is a linear motion bearing, an outer cylinder does to the movable member, and a shaft to the supporter.

For solving the above second theme, the invention has the following structure. The rolling bearing according to the invention, which is provided with the rotatably movable member, the supporter for supporting the movable member, and the plurality of rolling elements disposed between the movable member and the supporter for rolling together with the rotation of the movable member, is characterized in that the rolling elements are fabricated with a material of a heat conductivity being 40 W/m·K or less.

The rolling bearing may be of course sufficient with a rolling bearing charged with the lubricant.

Being such a structure, a heat insulation can be made between the movable member and the supporter, and therefore if the rolling bearing is used as a rolling bearing for the fan motor, in case the fan motor is of the high speed rotation and the high output, the heat generated at the stator can be effectively prevented from transmission to the rotor. Consequently, the temperature of the air blowing of the fan is avoided from rising, and heightening of the cooling effect is not hindered.

Further, as the temperature of the rolling bearing itself is also checked to heighten, it is difficult to cause bad lubricity, so that the rolling bearing has the excellent quietness for a long period of service.

For providing the effects as mentioned above, it is necessary that the rolling elements are fabricated with the material of the heat conductivity being 40 W/m·K or less, preferably 35 W/m·K or less for exhibiting the above effects more sufficiently, and more preferably 6 W/m·K or less.

A lower limit of the heat conductivity is not especially defined, but being too low, a temperature gradient is large between the movable member and the supporter, so that a gap within the bearing is changed to probably decrease rotation precision. Otherwise, since the heat is accumulated at the interior of the fan motor to increase the temperature of the rolling bearing, the life of the rolling bearing might be remarkably lowered. In view of these circumstances, the heat conductivity of the rolling elements is preferably 3 W/m·K or more.

Accordingly, the heat conductivity of the rolling elements should be 40 W/m·K or less, preferably 35 W/m·K or less, more preferably 3 to 35 W/m·K or less, and still more preferably 3 to 6 W/m·K or less.

In case, in addition to the rolling elements, at least one of the movable member and the supporter is composed with the material having the heat conductivity being 40 W/m·K or less, preferably 35 W/m·K or less, the heat conductivity to the rotor can be checked more effectively, and the above mentioned effects can be enough displayed.

As suitably usable materials, the above stainless steels or the ceramic materials may be exemplified. Sintered alloys or cermet of low heat conductivity may be suitably employed if a flexural strength is 600 MPa or more, preferably 900 MPa or more.

In particular, a partially stabilized zirconia where tetragonal system is mixed in cubic system is preferable as the heat conductivity is low as 3 to 6 W/m·K. Further in particular, zirconia which is pulverized so that crystal diameter of zirconia phase of cubic system to be matrix is 1.0 $\mu$m or less, is more preferable because of being excellent in strength and thermal stability.

The alumina zirconia based material where zirconia and alumina are compounded for improving strength and thermal characteristic is desirable, if crystal grain is adjusted to be 1.0 $\mu$m or less, because of the low heat conductivity and the excellent strength.

These sintered substances are preferable if being pressure-sintered, but if the flexural strength is 600 MPa or more, those sintered under atmospheric pressure will be usable.

In the rolling bearing, if designing the radius of curvature in the raceway surface of at least the supporter of the movable member and the supporter to be 52% or more of the diameter of the rolling element, the contacting area between the rolling element and the raceway surface is reduced, so that preferably the heat generated at the supporter is difficult to transmit to the movable member. For making the heat more difficult to transmit, the radius of curvature of the raceway surface is made 53% or more of the diameter of the rolling element.

If the radius of curvature of the raceway surface is too large, the surface pressure between the rolling member and the raceway surface is large correspondingly, so that a durable life of the rolling bearing is probable to shorten. Accordingly the upper limit of the radius of curvature in the raceway surface should be preferably 60% of the diameter of the rolling element.

In case the thickness of the outer ring of the rolling bearing is made larger than the thickness of the inner ring and the diameter in the central position (diameter of a pitch circle) of the rolling element between the outer and inner rings is made small, the moment to be taken for rotating the rolling bearing may be reduced.

For solving the above third theme, the invention has the following structure. The rolling bearing according to the invention, which is furnished with the rotatably movable member, the supporter for supporting the movable member, the plurality of rolling elements disposed between the movable member and the supporter for rolling together with the rotation of the movable member, and the lubricant charged in the space provided with the rolling elements therein between the movable member and the supporter, is characterized in that at least the rolling elements are fabricated with a material of a heat conductivity being 40 W/m·K or less.

With respect to the rolling bearing of the invention, in the rolling elements, movable member and supporter, since rolling surface or the whole of at least the rolling elements is composed with the material having the heat conductivity being 40 W/m·K or less, when the rolling bearing is used to the heat roll, it is possible to prevent the heat from escaping outside through the rolling bearing from the heat roll at high temperature, and cause to save the energy in the office machinery. Hereafter, a property difficult to escape the heat will be called as anti-heat radiation.

In case the heat conductivity exceeds 40 W/m·K, the heat escaping outside via the rolling bearing from the heat roll is extremely much, and accordingly the electric power necessary for heating the heat roll is so much and the energy is considerably consumed.

For fully displaying the above effects, preferably the heat conductivity of the material composing at least the rolling elements is 35 W/m·K or less.

As the desirably used materials of the heat conductivity being 40 W/m·K or less, the above mentioned ceramic and glass are listed up, and actually enumerated are silicone nitride ($Si_3N_4$), sialon, partially stabilized zirconia ($ZrO_2$), ceramic as alumina ($Al_2O_3$), or glasses as soda-lime glass and borosilicate glass. These ceramic and glass may be singly used or mixed together with two kinds or more.

When the rolling surface or the whole of at least the rolling element are composed with the ceramic or the glass, even if the contacting face between the rolling elements, movable member and supporter of the rolling bearing is not fully formed with the lubricant film, the rolling bearing can be worked for a long period and the torque life is long under severe conditions of high speed, high load, high temperature and the like, since the ceramic or glass have the low surface energy and the excellent heat resistance and are less to adhere.

In case the movable member and the supporter are formed with a metal material as SUJ2, if the rolling surface or the whole of the rolling element is composed with material having the heat conductivity satisfying the following conditions, the purposes of the invention can be accomplished.

The rolling bearing according to the invention, which is provided with the rotatably movable member, the supporter for supporting the movable member, the plurality of rolling elements disposed between the movable member and the supporter for rolling together with the rotation of the movable member, the lubricant charged in the space furnished with the rolling elements therein between the movable member and the supporter, and the movable member and the supporter being composed with a metal material, is characterized in that a ratio of k1/k2 of the heat conductivity k1 of the material composing the rolling element and the heat conductivity k2 of the material composing the movable member and the supporter is 0.80 or less (hereafter called as "the rolling bearing A for the office machinery"). The temperature of the rolling bearing used in the office machinery, in particular at the heat roll of the toner fixing part is around 200° C., and the above mentioned heat conductivity k1, k2 ranges 0 to 300° C.

Being such a rolling bearing, when the rolling bearing is used to the heat roll, it is possible to prevent the heat from escaping outside through the rolling bearing from the heat roll at high temperature, and cause to save the energy in the office machinery.

If the ratio of k1/k2 of the heat conductivity exceeds 0.80, the heat escaping outside via the rolling bearing from the heat roll is extremely much, and accordingly the electric power necessary for heating the heat roll is so much and the energy is considerably consumed.

For making the anti-heat radiation of the rolling bearing more sufficient, the ratio of k1/k2 of the heat conductivity is preferably set to be 0.70 or less, more preferably 0.65 or less.

The under mentioned rolling bearing can solve the first and second problems of the rolling bearing for the office machinery mentioned in the paragraph of the theme that the invention is to solve.

The rolling bearing which is provided with the rotatably movable member, the supporter for supporting the movable member, the plurality of rolling elements disposed between the movable member and the supporter for rolling together with the rotation of the movable member, and the lubricant charged in the space furnished with the rolling elements therein between the movable member and the supporter, is characterized in that a grease composition containing a thickening agent is the lubricant, said thickening agent being composed of at least one kind selected from layer-like mineral powder, ultra fine particle, and powder of layer-like substance having cleavage, composing elements of which layer-like substance are substantially all non-metallic, (hereafter called as "the rolling bearing B for the office machinery").

Herein, the grease composition is meant by the base oil, thickening agent and a semi-solid lubricant composed of said thickening agent. As the base oil or the thickening agent, ordinarily used base oil or thickening agent may be used without problems. As the base oil, for example, a silicone oil, or a mineral oil are listed up. As the thickening agent, for example, a solid fluorinated polymer powder, polyurea, metallic soap, silica gel are listed up.

In such a rolling bearing, the grease composition containing the thickening agent is the lubricant, and for reasons as later mentioned in detail, in the compact office machinery of high performance, if the rolling bearing itself is reduced in size and used under the conditions of high speed and high load, the lubricity is not be insufficient. Accordingly, neither the torque of the rolling bearing is remarkably increased by abrasion for a relatively short time, nor the rolling bearing is baked, and the torque life is long.

In particular, if the rolling bearing is used under an atmospheric air, at high temperature and high load, the lubricity is not be insufficient at the heat roll of the toner fixing part or the pressure roll. Accordingly, neither the torque of the rolling bearing is remarkably increased by abrasion for a relatively short time, nor the rolling bearing is baked, and the torque life is long. The rolling bearing is very suited to the recycling use of the heat roll part.

The thickening agent may be, as needed, used singly or in combination of two kinds or more of the above mentioned substances.

The mixing ratio of the thickening agent in the grease composition comprising the base oil and the thickening agent is preferably 0.5 to 15 wt %, more preferably 0.8 to 12 wt %, and most preferably 1 to 10 wt %. If the mixing ratio of the thickening agent is less than 0.5 wt %, an increasing effect of the lubricity is low, and an effect of suppressing leakage or splash of the lubricant cannot be sometime obtained. Further, if being more than 15 wt %, since the ratio of the base oil is decreased, and the kinematic viscosity of the grease composition is exceedingly high, the sufficient lubricity is not available and an abnormal abrasion occurs in a relatively short time and the torque is increased.

When the load is supported by the movable member, the raceway surface of the supporter and the rolling surfaces of the rolling elements, the thickening agent functions to avoid the metallic contact therebetween, and for fully displaying this function, the mixing ratio of the thickening agent is more preferably 0.8 wt % or more. In view of exactly avoiding such occasions that the thickening agent goes into more than necessarily between the raceway surface and the rolling surface to make the torque unstable, or the grease is hardened to heat, the mixing ratio of the thickening agent is desirably 12 wt % or less.

If the mixing ratio of the thickening agent is specified to be the most preferable value of 1 to 10 wt %, the effect mentioned in the above more preferable case is more fully displayed, and the hindering factor is exactly prevented.

If such a rolling bearing is applied to the rolling bearing of the invention or the rolling bearing of the ratio k1/k2 of the heat conductivity being 0.80 or less (the rolling bearing A for the office machinery), it is possible to provide the rolling bearing having the excellent characteristic as mentioned above in addition to the curtailment of the energy of the office machinery by reducing the heat radiation from the heat roll.

As the layer-like mineral powder, mica based minerals, vermiculite based minerals, or montmorillonite based minerals are listed up. The chemical composition of the mica based minerals is expressed with a general expression, $XMg_2Li(Y_4O_{10})Z_2$ or $XMg_{2.5}(Y_4O_{10})Z_2$, and the chemical composition of the vermiculite based minerals is expressed with the general expression, $X_{2/3}Mg_{7/3}Li_{2/3}(Y_4O_{10})Z_2$. The chemical composition of the montmorillonite based minerals is expressed with the general expression, $X_{1/3}Mg_{8/3}Li_{1/3}(Y_4O_{10})Z_2$. Herein, in the above general expressions, X is K, Na or Li, and Y is Si or Ge, and Z is F or OH.

It is preferable that the layer-like mineral powder contains, as an inter-layer ion, at least one of lithium ion and sodium ion. If the layer-like mineral powder containing the inter-layer ion having small ion radius is mixed with solvents such as water or oil, it swells by taking in the solvent in crystal layers. Since the grease composition to be used to the rolling bearing of the invention is adjusted by mixing the layer-like mineral powder having the swelling property and the base oil, and a part of the base oil is taken in into the layer-like mineral powder. Accordingly, if the lubricity is short at the contacting face between the rolling elements, the movable member and the supporter of the rolling bearing as mentioned in the above paragraph of the theme that the invention is to solve, the base oil can be supplied to said contacting face. If the base oil exists exceedingly in the contacting face, the excessive base oil can be taken in into the layer-like mineral powder. Thus, the base oil existing in the contacting face can be always maintained at a proper amount, and a good lubricity is available to extend the torque life of the rolling bearing and to effectively avoid the base oil from scattering when working the rolling bearing.

Further, it is more preferable to carry out a hydrophobic treatment on the interface of the layer-like mineral powder with a surface active agent for making hydrophobic. If making the interface hydrophobic, the water is prevented from taking in into the layer-like mineral powder, and the base oil can be taken in selectively and effectively. Therefore, the good lubricity can be maintained for a long period of service to heighten the torque life of the rolling bearing and decrease a dust amount (leakage of the lubricant).

If the surface active agent for making hydrophobic to be used to the hydrophobic treatment contains alkyl group having carbon atoms of eight or more, no limitation is defined, and often used is alkyl amine based surface active agent having functional group such as ammonium chloride, amino group (—$NH_2$ group), hydroxyl group (—OH group) and carboxyl group (—COOH group).

Preferably, the layer-like mineral powder has average diameter ranging 0.05 to 20 $\mu$m. If the average diameter is less than 0.05 $\mu$m, when mixing with the base oil for adjusting the lubricant, grains of the layer-like mineral powder aggregate one another to generate secondary grains and probably decrease dispersion. If being more than 20 $\mu$m, the layer-like mineral powder is difficult to invade between rolling and sliding contact surfaces of the rolling elements, movable member and supporter (hereafter called as "rolling-sliding contact surface"), so that the torque of the rolling bearing is largely increased, and as cases may be, the rolling bearing is impossible to operate.

As the ultra particles, there are ultra particle comprising inorganic substance (hereafter called as "inorganic ultra particles") and ultra particle comprising organic substance (hereafter called as "organic ultra particles").

The inorganic ultra particle has very small diameter, and a particle shape is almost globular having no corner, and average diameter is preferably 0.1 $\mu$m or less. If being more than 0.1 $\mu$m, the inorganic ultra particle is difficult to go into between the rolling-sliding contact surface or is probable to bite therebetween. In addition, since a grinding action is caused by the inorganic ultra particle, the raceway surface or the rolling elements of the rolling bearing increase surface roughness in a relatively short time, or abnormal abrasion is often generated, so that the torque of the rolling bearing is largely increased, and as cases may be, the rolling bearing is impossible to operate.

As examples of the inorganic ultra particle, there are enumerated diamond ultra particle (CD), diamond ultra particle whose surface is composed of graphite, fluorene ($C_{60}$), silicone oxide ($SiO_2$), titanium oxide ($TiO_2$), zirconium oxide ($ZrO_2$), or magnesium oxide (MgO).

Among the inorganic ultra particles, in particular, the diamond ultra particle is very stable chemically and has superior characteristic of very hard and less to be destroyed.

In fluorene $C_{60}$, units of a benzene ring structure comprising carbon of predetermined number are combined continuously in globe, and fluorene $C_{60}$ is a globular carbon cluster having carbon number of 60 where the carbon skeleton has a closed shell structure as a soccer ball. Fluorene $C_{60}$ has the globular molecular structure and has lubricity in itself, and it is known that the crystal structure thereof is not destroyed until around 1500° C. and fluorene $C_{60}$ is very suited as the thickening agent to be added to the grease composition.

Since the inorganic ultra particle has very fine diameter, and a particle shape is almost globular having no corner, the inorganic ultra particle invades between the rolling-sliding contact surfaces of the rolling bearing and rolls on surfaces of the respective members of the rolling bearing to cause micro bearing effect. Therefore, also in the cases of high load, low speed and thin lubricant film, abrasion or seizure caused by contact or aggregation between the contacting faces are prevented, so that a good lubricating condition can be maintained for a long period of time. Further, owing to the micro bearing effect by rolling of the inorganic ultra particle on the surfaces of the members, frictional resistance is reduced.

In particular, the diamond ultra particle is vary hard and less to be destroyed, and when it goes into between the contacting faces and rolls on the surfaces of the members, it is least to happen that a shape of the particle is made sharp as a whole by destruction of the particle or keen at corners, so that good lubricating conditions can be maintained for a long period of time. In addition, in case the diamond ultra particle is chemically coated with graphite on the surface, as the lubricity at boundary of the particle itself is advanced by the graphite on the surface, so that good lubricating conditions can be maintained for along period of time. Fluorene $C_{60}$ has the globular molecular structure and has lubricity in itself, and owing to the micro bearing effect and the lubricity of itself, good lubricating conditions can be maintained for a long period of time.

The organic ultra particle is not especially limited but ultra particle polymer produced by a known technique such as emulsion polymerization, multi-stage emulsion polymerization, suspension polymerization or NAD (non-dispersibility). As the ultra particle polymer, there are enumerated, for example, polymer or copolymer of acrylic ester shown with a general expression $CH_2=CHCOOR$ as methyl acrylate, ethyl acrylate, acrylate-2-ethylhexyl, and acrylate-n-butyl; polymer or copolymer of ester methacrylate shown with a general expression $CH_2=C(CH_3)COOR$ as ethyl methacrylate, glycidyl methacrylate, cyclohexyl methacrylate, hydroxtetyl methacrylate, methacrylate n-butyl, hexyl methacrylate, and methyl methacrylate; or styrene polymer, copolymer of styrene-ester acrylate, and copolymer of styrene-ester methacrylate.

The above grease compositions are adjusted by mixing the organic ultra particle and the base oil, and are filled in a space between the movable member and the supporter. Therefore, even if the organic ultra particle exists between the rolling-sliding contact surfaces and the base oil is not sufficient, the members of the rolling bearing are prevented from directly contacting one another.

The organic ultra particle is an intramolecular bridging high molecule having an internal three dimensional network structure, a so-called micro gel, and is very soft in comparison with metals or inorganic substances which are materials for composing the movable member, supporter and rolling elements. Therefore, the organic ultra particle neither damages the members of the rolling bearing nor accelerates abrasion.

The organic ultra particle has the bridging structure, and when mixing with solvents, it is not melted into the solvent but takes in the solvent into the bridging structure, and swells. In the rolling bearing of the invention, since the base oil is mixed with the organic ultra particle having a swelling property, a part of the base oil is taken in into the organic ultra particle. When the base oil lacks in the rolling-sliding contact surface, the base oil taken in the organic ultra particles existing between the rolling-sliding contact surfaces maybe supplied in the lacking rolling-sliding contact surface. When the base oil exists excessively in the rolling-sliding contact surface, it may be taken in among the organic ultra particle existing between the rolling-sliding contact surfaces. Therefore, the base oil existing in the rolling-sliding contact surface can be maintained at a proper amount, and can be effectively avoided from splashing when working the rolling bearing.

The organic ultra particle is ordinarily formed to be globular. In case of being globular, owing to the micro bearing effect by rolling of the organic ultra particle on the surfaces of the members, the frictional resistance is reduced at the rolling-sliding contact surface. Accordingly, fluctuations of the torque and seizure can be effectively prevented, and the good lubricating conditions can be maintained for a longer period of time.

It is preferable that the organic ultra particle is hydrophobic. Being hydrophobic, a water is prevented from entering into the organic ultra particle, and the base oil can be taken in selectively and effectively, so that the good lubricating conditions can be maintained for a longer period of time, and the torque life of the rolling bearing is extended while dust may be decreased. The surface active agent for making hydrophobic to be used to the hydrophobic treatment is the same as the case of the layer-like mineral substance.

The organic ultra particle can be modified on the surface with functional groups such as amino group (—$NH_2$ group), hydroxyl group (—OH group), carboxyl group (—COOH group), and carbon—carbon double bond group of polymerization (C=C group) Otherwise, it may be modified with a polymer chain which is formed with the carbon—carbon double bond group, and this polymer chain is grafted. By performing such a treatment on the surface of the organic ultra particle, the dispersion to the base oil is stabilized and adsorption to the members is increased, so that the good lubricating conditions can be maintained for a longer period of time.

Preferably, the organic ultra particle has average diameter ranging 0.02 to 1 $\mu$m. If the average diameter is less than 0.02 $\mu$m, when mixing with the base oil for adjusting the lubricant, the organic ultra particles aggregate one another to generate secondary particles and probably decrease dispersion. If being more than 1 $\mu$m, the layer-like mineral powder is difficult to invade between the rolling-sliding contact surfaces, so that the torque of the rolling bearing is largely increased, and as cases may be, the rolling bearing is impossible to operate.

As the powders of the layer-like substances having cleavage where all the composing elements are substantially non-metallic, listed up are amino acid compound (N-lauroyl.L lysine), melamine cyanurate (MCA), carbon fluoride, fluoride pitch, fluoride graphite, or hexagonal boron fluoride (hBN).

Among the powders of the layer-like substances having cleavage where all the composing elements are substantially non-metallic, N-lauroyl.L lysine is expressed with the following chemical formula, having a cleavable lamella structure as graphite.

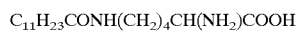

Melamine cyanurate (MCA) is ordered in plane in that melamine molecule and cyanuric acid molecule are combined alternately and strongly by hydrogen bond, and the planes are overlapped one another with weak combining force as van der Waals forces, having a cleavable lamella structure as graphite.

Carbon fluoride, fluoride graphite and fluoride pitch are shown with composition formulae of $(CF)_n$, $(CF_2)_n$ and $(C_2F)_n$, and can be easily obtained by fluorinating a carbon source using a fluorinating agent as fluoride gas. The carbon source is not especially limited. Mary kinds of carbon source can be used, for example, crystalline graphite, pitch, amorphous carbon and so on. In addition, not completely fluorinated substances, that is, unreacted carbon remaining substances may be employed.

The above mentioned amino acid compound (N-lauroyl.L lysine), melamine cyanurate (MCA), carbon fluoride, fluoride graphite, and fluoride pitch have the cleavable layer-like crystal structure such as graphite or hexagonal boron fluoride, physically adsorb to the rolling-sliding contact surface and cleave, and therefore even if the lubricity by the base oil between the rolling-sliding contact surfaces is insufficient, the rolling-sliding contact surfaces are prevented from directly contacting one another, and the frictional coefficient is decreased. Therefore, abrasion is difficult to occur at the rolling-sliding contact surface, and increase of the torque and seizure can be effectively prevented.

By the way, it is preferable that the powders of the layer-like substances having cleavage where all the composing elements are substantially non-metallic have average diameter ranging 0.05 to 20 μm. If the average diameter is less than 0.05 μm, when mixing with the base oil for adjusting the lubricant, particles of the layer-like powder aggregate one another to generate secondary particles and probably decrease dispersion. If being more than 20 μm, the layer-like powder is difficult to invade between the rolling-sliding contact surfaces, so that the torque of the rolling bearing is largely increased, and as cases may be, the rolling bearing is impossible to operate.

As above mentioned, depending on kinds of the thickening agents, desirable average diameters are different. The reasons therefor will be explained by example of the layer-like mineral powder and inorganic ultra particles.

The particle of the layer-like mineral powder has a fish scale-like shape, and thickness smaller than that of the average diameter. The layer-like mineral powder is easy to cleave and soft, and if the average diameter preferably ranges 0.1 to 10 μm, the layer-like mineral powder may go into between the rolling-sliding contact surfaces and does not injure the rolling-sliding contact surface. However, if the shape is globular as the inorganic ultra particle, the grains having the average diameters exceeding 0.1 μm (particles larger than thickness of the oil film intervening between the rolling-sliding contact surfaces) sometimes do not go into between rolling-sliding contact surfaces, and since the inorganic ultra particle is hard, the particles having the average diameter exceeding 0.1 μm is probable to cause abrasion in the rolling-sliding contact surface. Thus, the layer-like mineral powder and the inorganic ultra particle are different in ranges of preferable diameters.

The grease composition may be mixed, as needed, with additives in ranges so far as not spoiling purposes. As additives to us used, antioxidant, corrosion prevention or extreme pressure agent will be enumerated.

The rolling bearing as mentioned under may solve the first and second problems of the rolling bearing for the office machinery mentioned in the paragraphs referring to the themes that the invention is to solve, and in particular the rolling bearing is low in torque and may contribute to the saving of the energy of the office machinery such as copiers, laser beam printers, facsimile, or their compound machinery.

The rolling bearing according to the invention, which is provided with the rotatably movable member, the supporter for supporting the movable member, the plurality of rolling elements disposed between the movable member and the supporter for rolling together with the rotation of the movable member, the lubricant charged in the space furnished with the rolling elements therein between the movable member and the supporter, is characterized in that the lubricant has the grease composition where the base oil and the thickening agent composed of solid fluorinated polymer are main components and an oil separation for 24 hours at 200° C. or lower is 16.0% or less, said base oil being composed of liquid fluorinated polymer and having kinematic viscosity of 200 to 700 mm$^2$/sec at 40° C. (hereafter called as "the rolling bearing C for the office machinery").

It is preferable that the amount of charging the grease composition in the space is 8 to 23 vol % of a capacity of the space (the inside space capacity of the bearing).

Preferably, the grease composition has the solid lubricant of 0.5 to 5.0 wt %, said solid lubricant being composed of at least one kind selected from layer-like mineral powder, ultra fine granulate, and powder of layer-like substance having cleavage, composing elements of which layer-like substance are substantially all non-metallic.

In the compact office machinery of high performance, if the rolling bearing itself is reduced in size and used under the conditions of high speed and high load, the lubricity is not be insufficient. Accordingly, neither the torque of the rolling bearing is remarkably increased by abrasion for a relatively short time, nor the rolling bearing is baked, and the torque life is long.

In particular, if the rolling bearing is used under an atmospheric air, at high temperature and high load, the lubricity is not be insufficient at the heat roll of the toner fixing part or the pressure roll. Accordingly, neither the torque of the rolling bearing is remarkably increased by abrasion for a relatively short time, nor the rolling bearing is baked, and the torque life is long. The rolling bearing is very suited to the recycling use of the heat roll part.

As the grease composition as mentioned above is filled as the lubricant, the rolling bearing is low torque and much contributes to the curtailment of the energy.

Accordingly, if such a rolling bearing is applied to the rolling bearing of the invention or the rolling bearing (the rolling bearing A for the office machinery) where the ratio k1/k2 of the heat conductivity is 0.80 or less, it is possible to provide the rolling bearing having the excellent characteristics as said above in addition to the curtailment of the energy of the office machinery by decreasing the heat radiation from the heat roll.

It is preferable that the kinematic viscosity of the base oil of the grease composition at 40° C. is 200 to 700 mm$^2$/sec as mentioned above. If the kinematic viscosity is less than 200 mm$^2$/sec, when the temperature becomes near 200° C., the base oil easily gets out of the rolling bearing in company with the rotation of the rolling bearing, lacks in an amount of working as the lubricant, and insufficient in forming the oil film at the contacting point between the rolling elements and the inner-outer rings. As a result, since the rolling elements and the inner-outer rings directly contact (metal-metal contact), the life of the rolling bearing is sometimes extremely shortened.

If the kinematic viscosity is more than 700 mm$^2$/sec, a stirring resistance of the grease composition is very large, and the torque of the rolling bearing becomes large and consumption of the electric power is large, accordingly.

In short, if the kinematic viscosity of the base oil of the grease composition at 40° C. is 200 to 700 mm$^2$/sec, the base oil does not get out outside when the rolling bearing is rotated, so that the lubricant film is fully formed and the stirring resistance is low, and the torque of the rolling bearing is small and the consumption of the electric power may be lowered with the long life of the rolling bearing.

The kinematic viscosity of the base oil of the grease composition at 40° C. is preferably 250 to 650 mm$^2$/sec, more preferably 300 to 600 mm$^2$/sec.

The above grease composition is preferably 16.0% or less in the oil separation at 200° C. or lower for 24 hours. If being more than 16.0%, the base oil is easy to leak outside of the rolling bearing, and is short in an amount of working as the lubricant, and insufficient in forming the oil film at the contacting point between the rolling elements and the inner-outer rings. As a result, since the rolling elements and the inner-outer rings directly contact (metal-metal contact), the life of the rolling bearing is some times extremely shortened, and at the same time the base oil leaking outside will stain sheets (for example, copy papers) to be used in the office machinery.

For the oil separation of the grease composition to be 16.0% or less, the amount of the thickening agent (the solid fluorinated polymer) contained in the grease composition should be 15 wt % or more.

That is, if the oil separation is not more than 16%, when using the grease composition, the base oil is difficult to get out of the rolling bearing, so that the oil film contributing to the lubrication is sufficiently formed, and the rolling bearing with a long life may be obtained.

The oil separation at 200° C. or lower for 24 hours is preferably 15.5% or less, more preferably 15.0% or less. It is possible thereby to steadily prevent the leakage of the base oil in the grease composition and to make the above effects secure.

It is preferable that the amount of charging the grease composition in the space is 8 to 23 vol % of a capacity of the space. If being less than 8 vol %, the amount of the lubricant is insufficient, the rolling bearing becomes seized in a short period. If exceeding 23 vol %, the stirring resistance of the grease composition is considerably large, so that the rotation torque of the rolling bearing is large, and accordingly the consumption of the electric power is large.

In short, when the charging amount is 8 to 23 vol %, the lubricant is fully secured with the long life, the small torque of the rolling bearing and the low consumption of electric power.

The amount of charging the grease composition in the space is more preferably 10 to 21 vol % of a capacity of the space, still more preferably 10 to 18 vol %. In such a way, the above mentioned effects can be provided more steadily.

Further, it is preferable for the grease composition to contain the solid lubricant 0.5 to 5.0 wt %. If being less than 0.5 wt %, an effect heightening the lubricity cannot be sometimes obtained. Exceeding 5.0 wt %, the grease composition becomes extremely hard, and consequently the torque of the bearing is very large, so that the consumed electric power is large.

When containing the solid lubricant 0.5 to 5.0 wt %, the lubricity of the rolling bearing is heightened with the long life, and as the grease composition is not hard, the rotation torque of the rolling bearing is small and the consumed electric power may be reduced.

The amount of solid lubricant in the grease composition is more preferably 0.8 to 4.0 vol %, still more preferably 1.0 to 3.0 vol %. In such a way, the above mentioned effects can be provided more remarkably.

For the solid lubricant, it is sufficient to use singly one kind or combine two kinds or more of the layer-like mineral powder, ultra fine particle, and powder of layer-like substance having cleavage, composing elements of which layer-like substance are substantially all non-metallic. Incidentally, this solid lubricant is also served as the thickening agent.

Preferable embodiments as the solid lubricant are as follows.

(1) The interface of the solid lubricant is performed through the hydrophobic treatment with the surface active agent for making hydrophobic (treated to expel the water and selectively inlet or outlet the oil).
(2) The layer-like mineral powder is at least one kind selected from the group comprising mica based minerals, vermiculite based minerals, or montmorillonite based minerals.
(3) The layer-like mineral powder contains, as an inter-layer ion, at least one of lithium ion and sodium ion.
(4) The ultra particle is at least one kind selected from diamond ultra particle (CD), diamond ultra particle whose surface is composed of graphite, fluorene ($C_{60}$), silicone oxide ($SiO_2$), titanium oxide ($TiO_2$), zirconium oxide (ZrO2), or magnesium oxide (MgO).
(5) The average diameter of the ultra particle is 0.1 μm or less.
(6) The powders of the layer-like substances having cleavage where all the composing elements are substantially non-metallic, are at least one kind of amino acid compound (N-lauroyl.L lysine), melamine cyanurate (MCA), carbon fluoride, fluoride pitch, fluoride graphite, or hexagonal boron fluoride (hBN).
(7) The average diameters of the layer-like mineral powder or the powders of the layer-like substances having cleavage where all the composing elements are substantially non-metallic, are within the range of 0.05 to 10 μm.

Detailed explanation of the solid lubricant is the same as in the thickening agent of the rolling bearing B for the office machinery, and it is omitted.

The rolling apparatus of the invention is especially suited when used nearly to the heat source, or applied to the fan motor or the office machinery, and of course it can display the excellent characteristics when applied to any other machinery or to usage.

Of the rolling apparatus according to the invention, the rolling bearing can be served to various rolling bearings, for example, a deep groove ball bearing, angular ball bearing, cylindrical roller bearing, needle roller bearing, thrust ball bearing, thrust cylindrical roller bearing, or the like.

DETAILED DESCRIPTION OF THE PREFERRED EMBODIMENTS

Explanation will be made to the mode of reducing the rolling apparatus of the invention to practice referring to the attached drawings and tables.

[First Embodiment]

Figure 1:
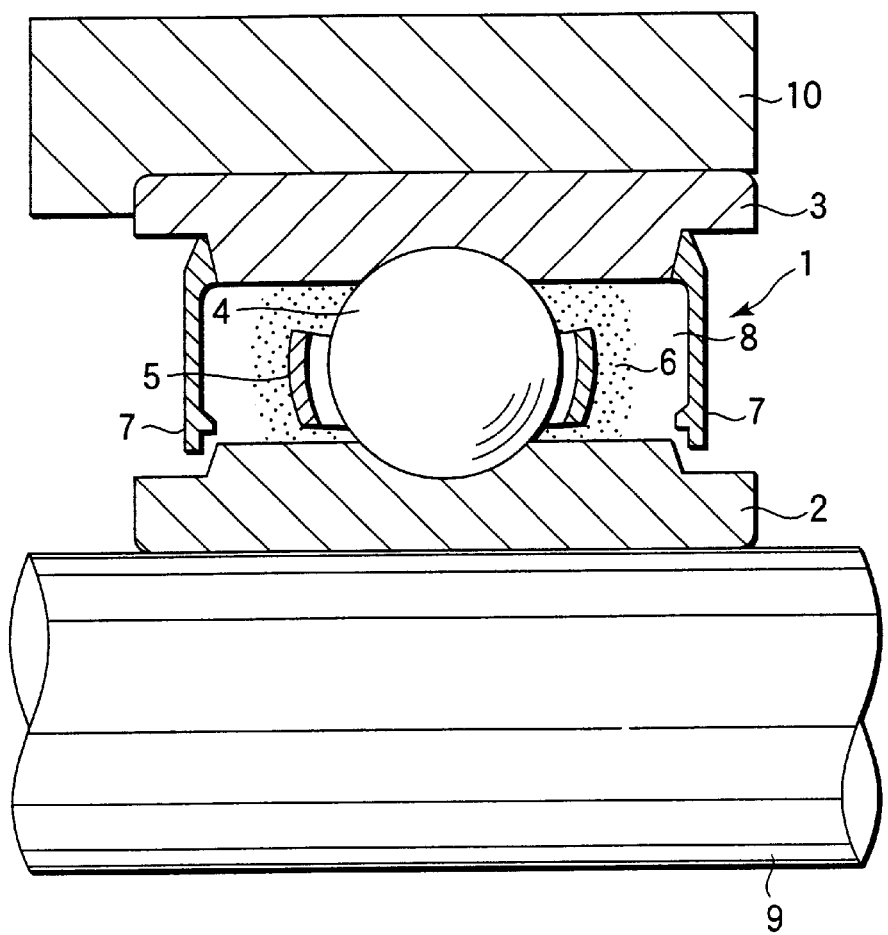
FIG. 1 shows a partially cross sectional view showing a structure of one embodiment of the rolling bearing according to the invention.

FIG. 1 is a partially and vertically cross sectional view showing a structure of the rolling bearing for the office machinery which is one embodiment of the rolling bearing according to the invention.

The rolling bearing 1 shown in FIG. 1 is that the rolling bearing of the invention is applied to a deep groove ball bearing for rotating the inner ring. The rolling bearing 1 is secured at an outer ring 3 to a housing 10 and mounted at an inner ring 2 on the outside of a shaft 9. Between the inner ring 2 and the outer ring 3, a space 8 is defined where a plurality of rolling elements 4 are disposed and rotatably held by waveform holders 5 following a predetermined circumference. Further, between the inner ring 2 and the outer ring 3 as both sides of the rolling bearing 1, there are furnished shielding plates 7, 7, and in the space 8 encircled with the inner ring 2, outer ring 3 and shielding plates 7, 7, a grease composition 6 is charged.

Incidentally, the inner ring 2 corresponds to the movable member being one of the composing elements of the invention, while the outer ring 3 corresponds to the supporter for supporting the movable member.

EXAMPLES 1 to 33

Next, reference will be made to evaluated results of the torque lives by rotation tests made to the rolling bearings of the present embodiments and the conventional rolling bearings.

To the rolling bearings of the Examples and the Comparative Examples, the deep groove ball bearings for rotating the inner rings made by Nippon Seiko Kabushiki Kaisha (Type No.: 6907, inner diameter: 35 mm, outer diameter: 55 mm, width: 10 mm) were used, the grease composition was charged around 3 g in the insides, and rotating tests were carried out under later mentioned conditions by means of a bearing rotation tester made by Nippon Seiko Kabushiki Kaisha. In reference to the bearing torque at the initial period of the test, evaluations were made as lives of the rolling bearings at points where the torque values rapidly increased.

Material qualities of the inner, outer rings and the rolling elements, and the content of the grease composition (the thickening agent contained in the grease composition: 3 wt %) are as shown in Tables 1 to 3. The used base oils and thickening agents are as follows.

Urea grease . . . ENS made by Nippon Oil Co., Ltd.
Silicone grease . . . Toray Silicone SH44M by Toray Industry
Fluoride grease 1 . . . Crytocs GPL577 by Du Pont
Fluoride grease 2 . . . Crytocs GPL225 by Du Pont
Fluoride grease 3 . . . KP1 by NOK Kruber
Layer-like mineral powder . . . Composite mica 4C-TS by Topy Industry,
  Average diameter: 3 μm
Diamond ultra particle . . . MYPOMEX by Du Pont
  Average diameter: 0.1 μm
Organic ultra particle . . . Nippe Micro Jel P1800 by Nippon Pain Co., Ltd.
  Average diameter: 0.05 μm
Amino acid compound . . . Feymex L-12J by Ajinomoto Co., Ltd.
  Average diameter: 3 μm
MCA . . . Melamine Silanurate by Mitsubishi Chemical Co., Ltd.
  Average diameter: 2 μm
Fluoride pitch . . . Fluoride pitch by Osaka Gas Co., Ltd.
  Average diameter: 1 μm
hBN . . . Hexagonal boron fluoride GP by Denki Kagaku Kogyo
  Average diameter: 2 μm Testing conditions are as follows.
Testing temperatures: 100, 150, 200° C.
Atmosphere: Atmospheric air
Rotation speed: 200 rpm
Axial load: 980 N Test results are shown in Tables 1 to 3. In each of the Examples, the torque life is largely improved in comparison with the corresponding Comparative Example. The torque lives of the rolling bearings of the Examples and the Comparative Examples are relative values when the life of the Comparative Example in each of Table is 1.

TABLE 1

| | Outer • Inner rings | Rolling elements | Grease compositions | Torque life (100° C.) |
|---|---|---|---|---|
| Ex. 1 | SUJ2 | SUJ2 | Urea-grease + Layer mineral powder | 6 |
| Ex. 2 | SUJ2 | SUJ2 | Urea-grease + Organic super fine powder | 8 |
| Ex. 3 | SUJ2 | SUJ2 | Urea-grease + Amino acid compound | 4 |
| Ex. 4 | SUJ2 | SUJ2 | Urea-grease + Amino acid compound (2%) + Organic super fine powder (1%) | 7 |
| Ex. 5 | SUJ2 | SUJ2 | | 3 |
| Ex. 6 | SUJ2 | SUJ2 | Urea-grease + MCA | 9 |
| Ex. 7 | SUJ2 | $Si_3N_4$ | Urea-grease + Diamond super fine powder | 23 |
| Ex. 8 | SUJ2 | $ZrO_2$ | Urea-grease + Layer mineral powder | 21 |
| Ex. 9 | SUJ2 | Sialon | | 20 |
| Ex. 10 | SUJ2 | Glass | Urea-grease + hBN Urea-grease + Fluoride pitch | 15 |
| Com. 1 | SUJ2 | $SUJ_2$ | Urea-grease + Amino acid compound Urea-grease | 1 |

Ex.: Example
Com.: Comparative Example

TABLE 2

| | Outer • Inner rings | Rolling elements | Grease compositions | Torque life (150° C.) |
|---|---|---|---|---|
| Ex. 11 | SUJ2 | SUJ2 | Silicon grease + Layer mineral powder | 7 |
| Ex. 12 | SUJ2 | SUJ2 | Silicon grease + Amino acid compound | 5 |
| Ex. 13 | SUJ2 | SUJ2 | Silicon grease + MCA | 4 |
| Ex. 14 | SUJ2 | SUJ2 | Silicon grease + Diamond super fine powder | 10 |
| Ex. 15 | SUJ2 | $Si_3N_4$ | Silicon grease + Fluoride pitch | 21 |
| Ex. 16 | SUJ2 | $ZrO_2$ | Silicon grease + Amino acid compound | 20 |
| Ex. 17 | SUJ2 | Sialon | Silicon grease + hBN | 23 |
| Ex. 18 | SUJ2 | Glass | Silicon grease + Layer mineral powder | 17 |
| Com. 2 | SUJ2 | SUJ2 | Silicon grease | 1 |

Ex.: Example
Com.: Comparative Example

TABLE 3

| | Outer • Inner rings | Rolling elements | Grease compositions | Torque life (200° C.) |
|---|---|---|---|---|
| Ex. 19 | SUJ2 | SUJ2 | Fluoride grease 1 + MCA | 5 |
| Ex. 20 | SUJ2 | SUJ2 | Fluoride grease 1 + Layer mineral powder | 8 |
| Ex. 21 | SUJ2 | SUJ2 | Fluoride grease 2 + Amino acid compound | 4 |
| Ex. 22 | SUJ2 | SUJ2 | Fluoride grease 3 + Layer mineral powder | 10 |
| Ex. 23 | SUJ2 | SUJ2 | Fluoride grease 1 + Diamond super fine powder | 15 |
| Ex. 24 | SUJ2 | SUJ2 | Fluoride grease 3 + hBN | 7 |
| Ex. 25 | SUJ2 | $Si_3N_4$ | Fluoride grease 3 + Layer mineral powder | 28 |
| Ex. 26 | SUJ2 | ZrO2 | Fluoride grease 2 + hBN | 25 |
| Ex. 27 | SUJ2 | Sialon | Fluoride grease 1 + Fluoride pitch | 23 |
| Ex. 28 | SUJ2 | Glass | Fluoride grease 2 + Layer mineral powder | 18 |
| Com. 3 | SUJ2 | SUJ2 | Fluoride grease 1 | 1 |

Ex.: Example
Com.: Comparative Example

Changes of the torque lives of the rolling bearings were evaluated by the mixing ratios of the thickening agents in the grease compositions. The material qualities of the inner and outer rings and the rolling elements were SUJ2, and other conditions were the same as those of the previous test.

Figure 2:
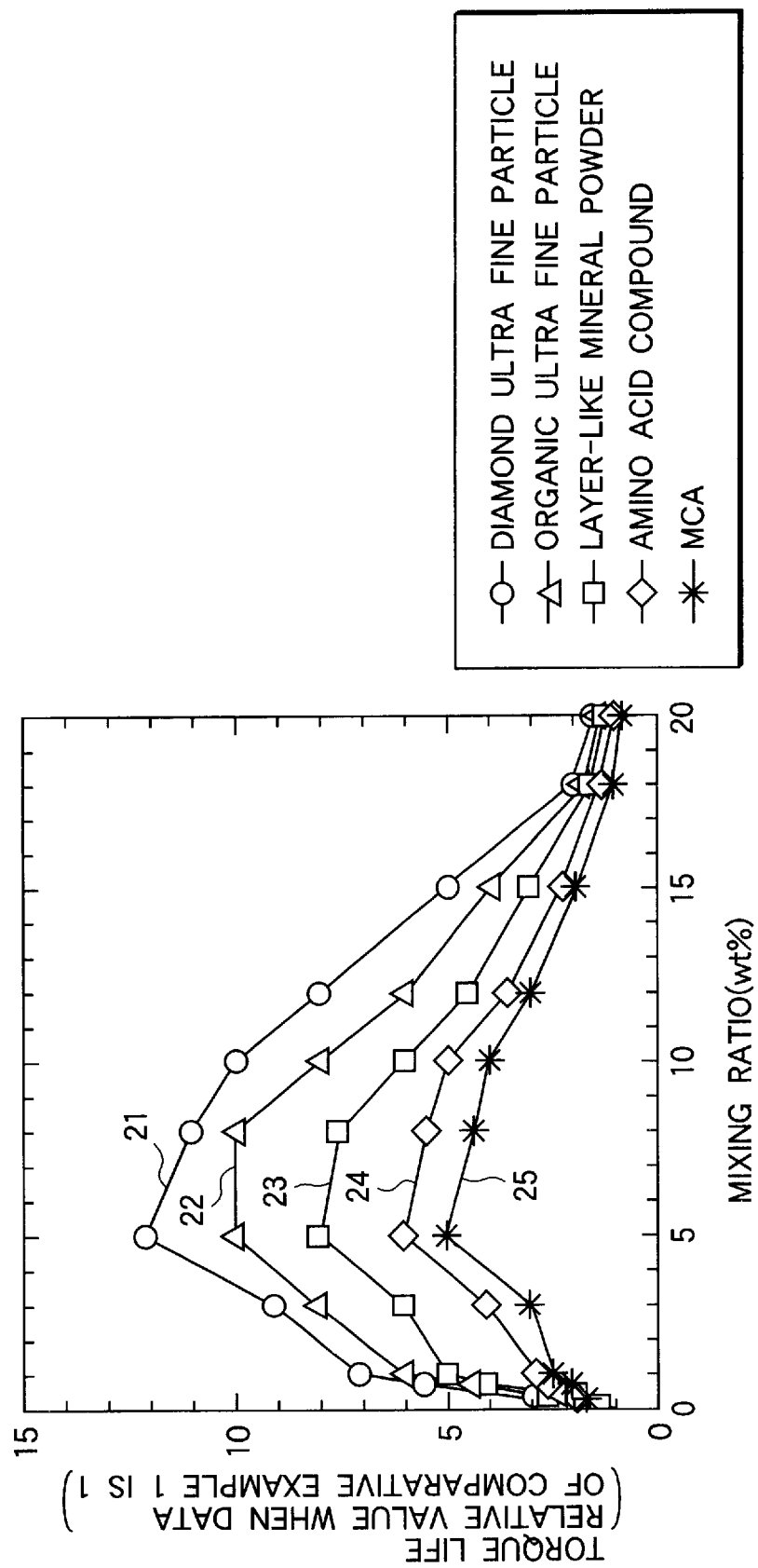
FIG. 2 is a graph showing torque lives of the rolling bearing when changing the mixing ratio of the thickening agent in the grease composition where the urea based grease and several kinds of thickening agents are mixed.
Figure 3:
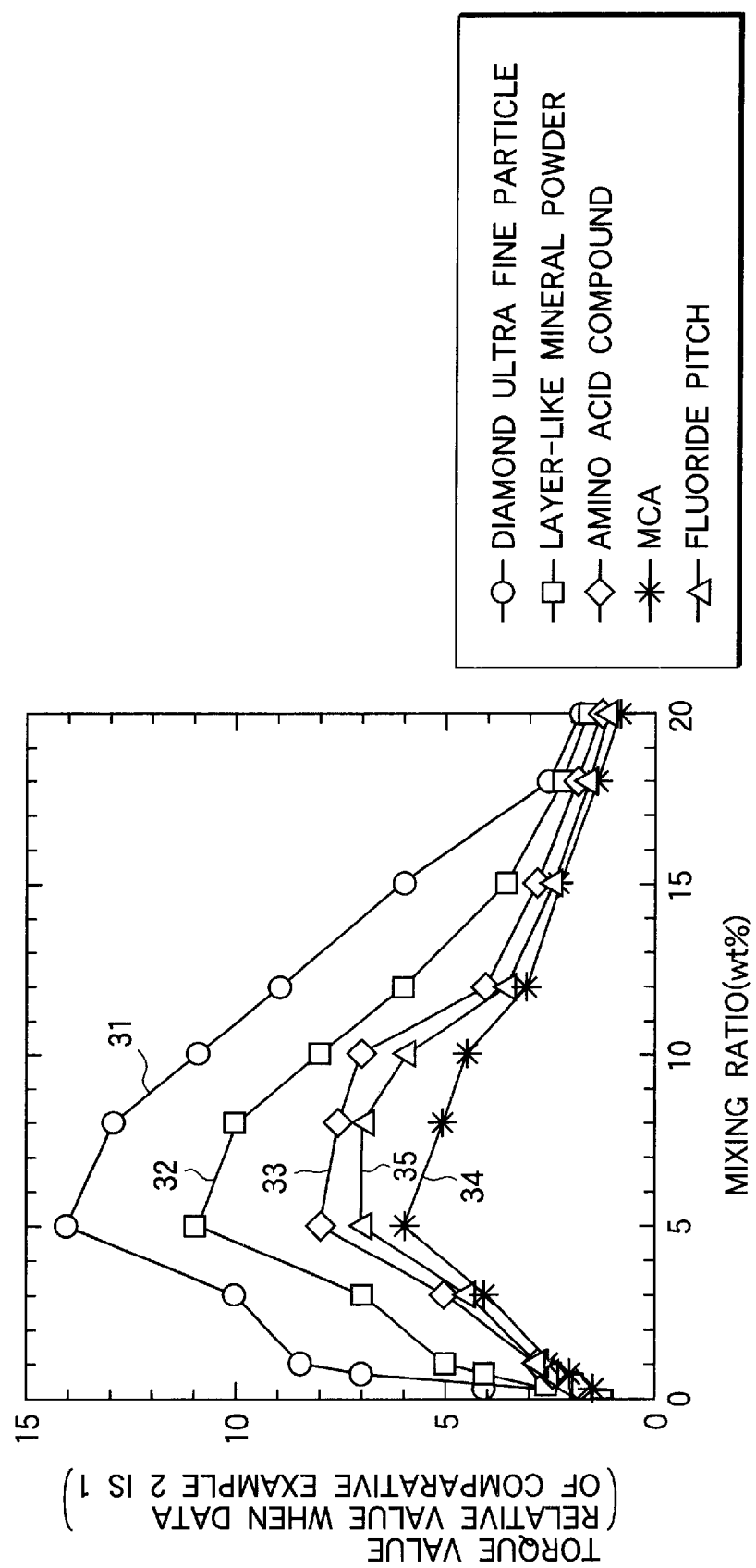
FIG. 3 is a graph showing torque lives of the rolling bearing when changing the mixing ratios of the thickening agents in the grease compositions where the silicone grease and several kinds of thickening agents are mixed.
Figure 4:
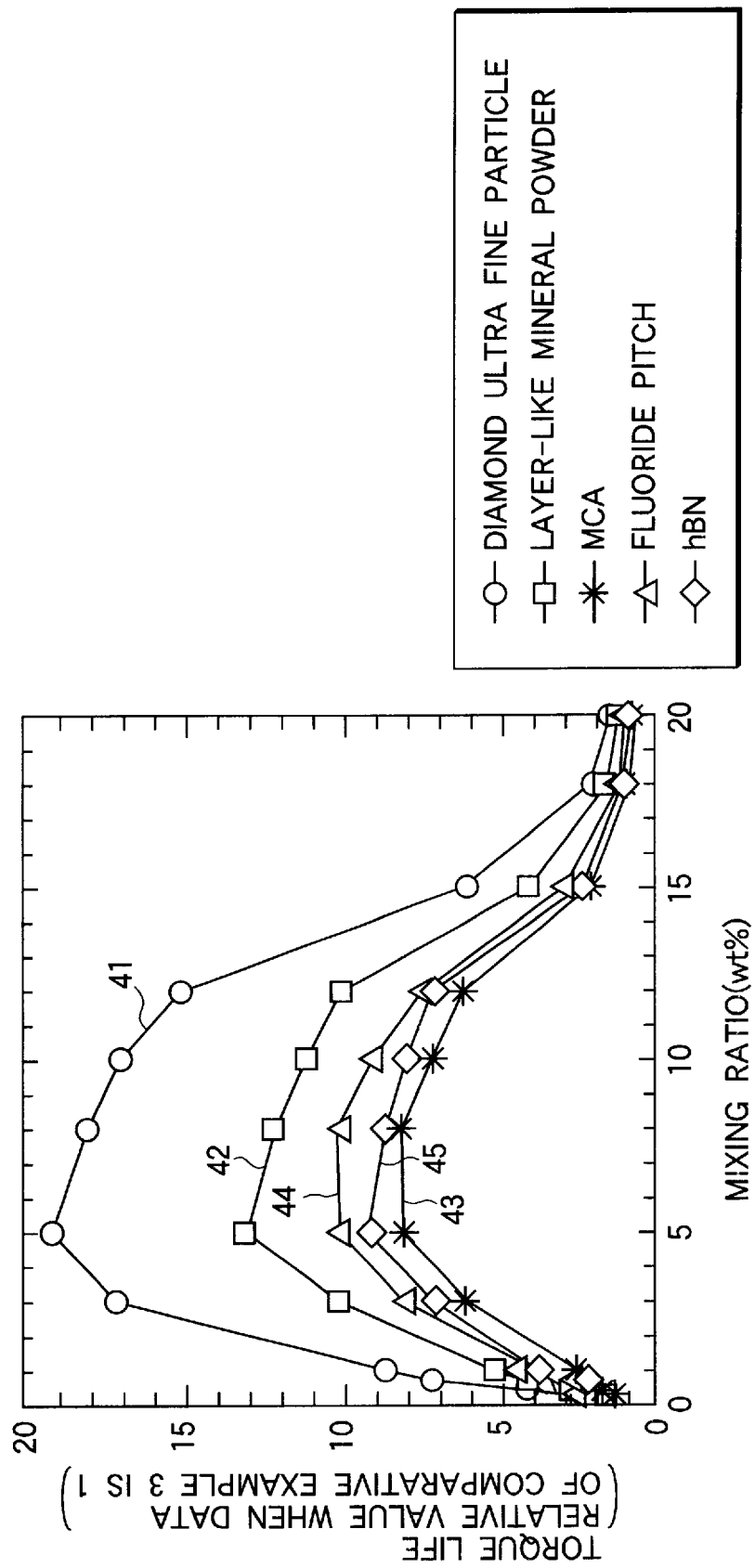
FIG. 4 is a graph showing torque lives of the rolling bearing when changing the mixing ratios of the thickening agents in the grease compositions where the fluoride grease and several kinds of thickening agents are mixed.

The results are shown in FIGS. 2 to 4. The torque life of each of the vertical axes is the relative value when the torque life in the case of the only base oil without adding the thickening agent is 1.

FIG. 2 is cases of the grease compositions where the thickening agents of predetermined amounts were mixed in the urea based greases. As to the mixed thickening agents, the curve 21 is the diamond ultra particle, the curve 22 is the organic ultra particle, 23 denotes the layer-like mineral powder, 24 denotes the amino acid compound, and 25 is MCA. The testing temperature was 100° C.

FIG. 3 is cases of the grease compositions where the thickening agents of predetermined amounts were mixed in the silicone greases. As to the mixed thickening agents, the curve 31 is the diamond ultra particle, the curve 32 is the layer-like mineral powder, 33 denotes the amino acid compound, 34 denotes MCA, and 35 is the fluoride pitch. The testing temperature was 150° C.

FIG. 4 is cases of the grease compositions where the thickening agents of predetermined amounts were mixed in the fluoride greases 3. As to the mixed thickening agents, the curve 41 is the diamond ultra particle, the curve 42 is the layer-like mineral powder, 43 denotes MCA, 44 denotes the fluoride pitch and 45 is hBN. The testing temperature was 200° C.

For studying influences of the material qualities of the rolling elements given to the anti-heat radiation of the rolling elements (difficulty to release the radiation heat), under the condition where the rolling bearing (Type No. 6907) was not filled with the grease composition, namely, the rolling bearing was composed with the rolling elements, inner ring, outer ring, and waveform holder, the time taken until the temperature of the inner ring reached 200° C. was measured when a heater was wound on the outer ring of the rolling bearing for heating the outer ring 200° C. The material qualities of the inner ring and the outer ring of the rolling bearing were then SUJ2. Results are shown in Table 4 and data of the heat conductivity of respective materials are shown in Table 5 as reference values. The anti-heat radiation of the rolling bearing in the Examples and the Comparative Examples is the relative value where the time taken until the temperature of the inner ring reached 200° C. in the Comparative Example 4 is 1. The larger this value, the more difficult the heat escapes from the rolling bearing.

TABLE 4

| | Outer • Inner rings | Rolling elements | Anti-heat radiation |
|---|---|---|---|
| Example 29 | SUJ2 | $Si_3N_4$ | 55 |
| Example 30 | SUJ2 | $ZrO_2$ | 150 |
| Example 31 | SUJ2 | Sialon | 60 |
| Example 32 | SUJ2 | $Al_2O_3$ | 50 |
| Example 33 | SUJ2 | Glass | 200 |
| Com. 4 | SUJ2 | SUJ2 | 1 |
| Com. 5 | SUJ2 | SiC | 0.6 |

Com.: Comparative Example

TABLE 5

| Quality of Material | Heat conductivity (W/m · K) |
|---|---|
| SUJ2 | 50 |
| SUS440C | 24 |
| SiC | 60~270 |
| AlN | 70~260 |
| $Si_3N_4$ | 17~31 |
| $Al_2O_3$ | 17~31 |
| Sialon | 17~31 |
| $ZrO_2$ | 3 |
| Glass | 1 |

Figure 5:
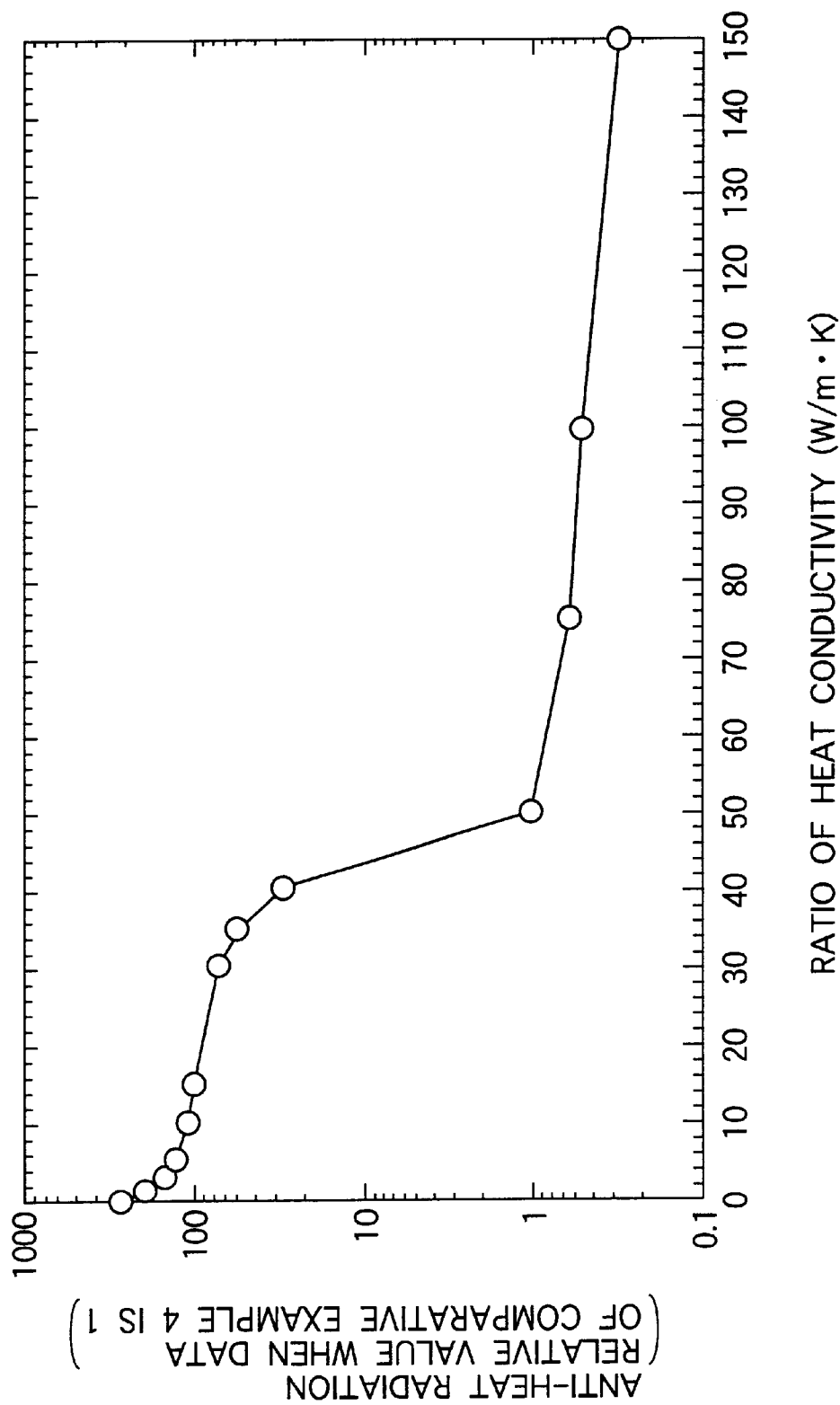
FIG. 5 is a graph showing anti-heat radiation when changing material qualities of the rolling elements.

The evaluations of the anti-heat radiation of the rolling bearing when changing the heat conductivities of the material qualities of the rolling elements were performed with the same method as the previous test (test whose results are shown in Table 4). Results are shown in FIG. 5. The vertical axis of the graph is the relative value when the value of the Comparative Example 4 in Table 4 is 1.

From the results, it is seen that when the heat conductivity of the material quality of the rolling elements is 40 W/m·K or less, the anti-heat radiation of the rolling bearing is superior.

Thus, the rolling bearing of the present embodiment is such a rolling bearing where the grease composition containing the thickening agent is the lubricant, said thickening agent being composed of at least one kind selected from layer-like mineral powder, ultra fine particle, and powder of layer-like substance having cleavage, composing elements of which layer-like substance are substantially all non-metallic. Therefore, the rolling bearing is excellent in the lubricity even at high speed, high temperature and under high load, and long in the torque life, and can be suitably used to the office machinery such as copiers, laser beam printers, facsimile, or their compound machinery.

In particular, if the rolling bearing is used under an atmospheric air, at high temperature and high load, the lubricity is not be insufficient at the heat roll of the toner fixing part or the pressure roll, and the torque life is long. The rolling bearing is suited to recycling use of the heat roll part.

In the rolling bearing of the present embodiment, the rolling elements are composed with the ceramic material of the low heat conductivity, and so it is possible to decrease the heat radiation from the heat roll and save the energy in the office machinery.

In this embodiment, the rolling bearing has been explained by example of the deep groove ball bearing, and of course the rolling bearing according to the invention is applicable to other kinds of rolling bearings.

In the invention, if at least the rolling elements are composed with materials of the low heat conductivity (40 W/m·K), those may be suitably used to the rolling bearing for the heat roll of the office machinery, and can heighten the effects thereof. The above mentioned lubricant has been explained as the preferable examples, and is not limited to the grease, the base oil thereof or the thickening agent.

EXAMPLES 34 to 40

In the rolling bearings substantially the same as the rolling bearings of the above embodiment, explanation will be made to examples of the rolling bearings where the inner and outer rings are composed of SUJ2, and the rolling elements are fabricated with such materials as the ratio of k1/k2 is 0.80 or less, k1 being the heat conductivity of the material for fabricating the rolling elements, and k2 being the heat conductivity of SUJ2 for composing the inner and outer rings (the present rolling bearings corresponding to the rolling bearing A for the office machinery), referring to the drawings and Tables.

To the rolling bearings of the Examples 34 to 40 and the Comparative Examples 6 to 8, the deep groove ball bearings for rotating the inner rings made by Nippon Seiko Kabushiki Kaisha (Type No.: 6906, inner diameter: 30 mm, outer diameter: 47 mm, width: 9 mm) were used, under the condition where the grease composition was not filled with, namely, the rolling bearing was composed with the rolling elements, inner ring, outer ring, and waveform holder, the time taken until the temperature of the inner ring reached 200° C. was measured when a heater was wound on the outer ring of the rolling bearing for heating the outer ring at 200° C. for studying influences of the material qualities of the rolling elements given to the anti-heat radiation of the rolling elements (difficulty to radiation heat).

Results are shown in Table 6, and data of the heat conductivity of the respective materials are shown in Table 5 as reference values. The anti-heat radiation of the rolling bearing in the Examples and the Comparative Examples is the relative value where the time taken until the temperature of the inner ring reached 200° C. in the Comparative Example 6 was 1. The larger this value, the more difficult the heat escapes from the rolling bearing.

TABLE 6

| | Outer • Inner rings | Rolling elements | Heat conductivity ratio K1/K2 (Heat conductivity of material of rolling element/ Heat conductivity of Inner and Outer rings) | Anti-heat radiation |
|---|---|---|---|---|
| Ex. 34 | SUJ2 | Si$_3$N$_4$ | 0.40 | 90 |
| Ex. 35 | SUJ2 | Si$_3$N$_4$ | 0.60 | 70 |
| Ex. 36 | SUJ2 | SUS440C | 0.48 | 80 |
| Ex. 37 | SUJ2 | ZrO$_2$ | 0.06 | 150 |
| Ex. 38 | SUJ2 | Sialon | 0.60 | 70 |
| Ex. 39 | SUJ2 | Al$_2$O$_3$ | 0.60 | 70 |
| Ex. 40 | SUJ2 | Glass | 0.02 | 200 |
| Com. 6 | SUJ2 | SUJ2 | 1 | 1 |
| Com. 7 | SUJ2 | SiC | 4 | 0.2 |
| Com. 8 | SUJ2 | AlN | 3 | 0.3 |

Ex.: Example
Com.: Comparative Example

Figure 6:
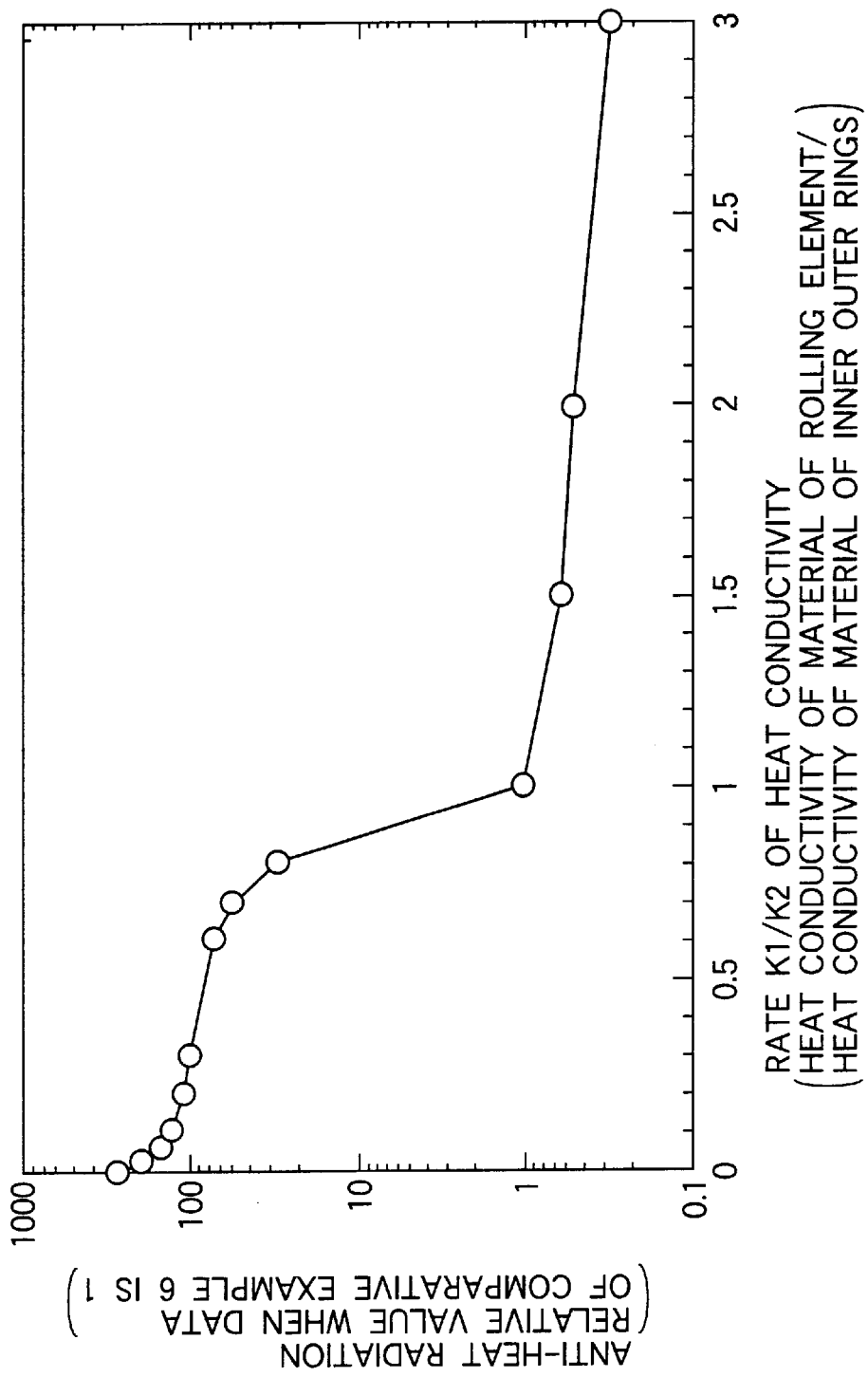
FIG. 6 is a graph showing anti-heat radiation when changing ratios of the heat conductivity.

The evaluations of the anti-heat radiation of the rolling bearing when changing the ratio k1/k2 of the heat conductivity were performed with the same method as the previous test (test whose results are shown in Table 6). Results are shown in FIG. 6. The vertical axis of the graph is the relative value when the value of the Comparative Example 6 in Table 6 is 1.

From the results, it is seen that when the ratio k1/k2 of the heat conductivity is 0.80 or less, the anti-heat radiation of the rolling bearing is superior, and the heat is difficult to escape. Accordingly, if the present rolling bearing is used to copiers, laser beam printers, facsimile, or the office machinery of their compound machinery, in particular to the heat roll of the toner fixing part, it is possible to reduce the escape of the heat outside through the rolling bearing from the heat roll at high temperature, and curtail the energy of the office machinery.

When using to the office machinery, an electric current flows into the rolling bearing and the rolling elements are sometimes effected with electrolytic corrosion, and therefore the material quality of the rolling element is desirably the ceramic.

EXAMPLES 41 to 47

With respect to the rolling bearing (corresponding to the rolling bearing C for the office machinery) employing the grease composition (fluoride grease) where main ingredients are the base oil comprising the liquid fluorinated polymer oil and the thickening agent comprising the solid fluorinated polymer, explanation will be made to results where the torque life was evaluated by the rotation test.

The evaluated rolling bearings were substantially the same as those of the above mentioned embodiment, and made by Nippon Seiko Kabushiki Kaisha (Type No.: 6907, inner diameter: 35 mm, outer diameter: 55 mm, width: 10 mm), the grease composition (the solid lubricant was added 3 wt % or not added to the fluoride grease) was charged. Material qualities of the inner, outer rings and the rolling elements, and the content of the grease composition are as shown in Table 7. The used fluoride greases are as follows, and the solid lubricants are the same as the thickening agents in the Examples 1 to 33.

Fluoride grease A . . . KP1 by NOK Kruber
  Kinematic viscosity (40° C.): 400 mm$^2$/sec
  Oil separation at 200° C. for 24 hours: 15%
Fluoride grease B . . . Crytocs 240AB by Du Pont
  Kinematic viscosity (40° C.): 85 mm$^2$/sec
  Oil separation at 200° C. for 24 hours: 11%
Fluoride grease C . . . Crytocs LVP by Du Pont
  Kinematic viscosity (40° C.): 2560 mm$^2$/sec
  Oil separation at 200° C. for 24 hours: 0.3%

As to these rolling bearings, the rotation tests were carried out under the conditions by means of a bearing rotation tester made by Nippon Seiko Kabushiki Kaisha.
Testing temperatures: 200° C.
Atmosphere: Atmospheric air
Rotation speed: 200 rpm
Axial load: 980 N
Charging amount of the grease composition: 20 vol % of the space capacity in the inside of the bearing.

In reference to the bearing torque at the initial period of the test, evaluations were made as lives of the rolling bearings at points where the torque values rapidly increased. The test results are shown in Table 7. The torque life of each of the Examples and the Comparative Examples is shown with the relative value when the torque life of the Comparative Example 9 is 1.

Each of the Examples is superior in the torque life to each of the Comparative Examples, and in particular, the rolling bearings containing the solid lubricant are very excellent in the torque life. The Comparative Examples are inferior in the torque lives, since the kinematic viscosity of the base oil at 40° C. and the oil separation of the grease composition at 200° C. for 24 hours were not at preferable values.

TABLE 7

|  | Outer • Inner rings | Rolling elements | Grease compositions | Torque life |
|---|---|---|---|---|
| Ex. 41 | SUJ2 | SUJ2 | Fluoride grease A | 10 |
| Ex. 42 | SUJ2 | SUJ2 | Fluoride grease A + Layer mineral powder | 50 |
| Ex. 43 | SUJ2 | SUJ2 | Fluoride grease A + Diamond super fine powder | 70 |
| Ex. 44 | SUJ2 | SUJ2 | Fluoride grease A + MCA | 30 |
| Ex. 45 | SUJ2 | SUS440C | Fluoride grease A | 20 |
| Ex. 46 | SUJ2 | $Si_3N_4$ | Fluoride grease A + Layer mineral powder | 80 |
| Ex. 47 | SUJ2 | Alumina | Fluoride grease A + Fluoride pitch | 40 |
| Com. 9 | SUJ2 | SUJ2 | Fluoride grease B | 1 |
| Com. 10 | SUJ2 | SUJ2 | Fluoride grease C | 3 |

Ex.: Example
Com.: Comparative Example

In a case of using, as the grease composition, the fluoride grease A or the fluoride grease A added with the solid lubricant (the adding amount: 3 wt %), the evaluations were made to the changes of the rotating torque value and the torque life of the rolling bearing by the charging amount of the grease composition in the rolling bearing (vol % of the space capacity in the inside of the bearing). In each case, the material quality of the inner and outer rings and the rolling elements were SUJ2, and other conditions were the same as in the previous tests.

Figure 7:
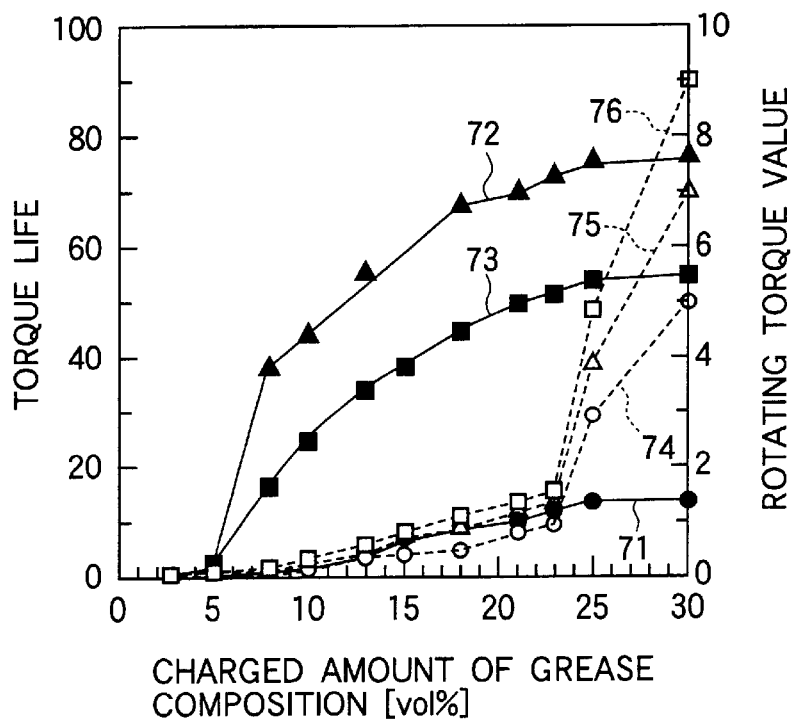
FIG. 7 is a graph showing the relationship in the amount of charging the grease composition in the rolling bearing, the torque lives and the rotating torque values of the rolling elements.

Results are shown in FIG. 7. The curves 71 and 74 show the torque life and the rotating torque when using the fluoride grease A only (no solid lubricant) as the grease composition, the curves 72 and 75 show the torque life and the rotating torque when using, as the grease composition, the fluoride grease A added with the diamond ultra particle as the solid lubricant, and the curves 73 and 76 show the torque life and the rotating torque when using, as the grease composition, the fluoride grease A added with the layer-like mineral powder as the solid lubricant. In FIG. 7, the rotating torque and the torque life of the vertical axis are the relative values when the value of the Comparative Example 9 is 1.

From the graph of FIG. 7, it is seen that as increasing the charging amount of the grease composition in the rolling bearing (vol % of the space capacity in the inside of the bearing), the torque life of the rolling bearing is improved, but the rotating torque value rapidly increases when the charging amount of the grease composition exceeds 23.0 vol %.

The same evaluations were made to changes of the rotating torque value and the torque life of the rolling bearing by the adding amount of the solid lubricant to the fluoride grease A.

Figure 8:
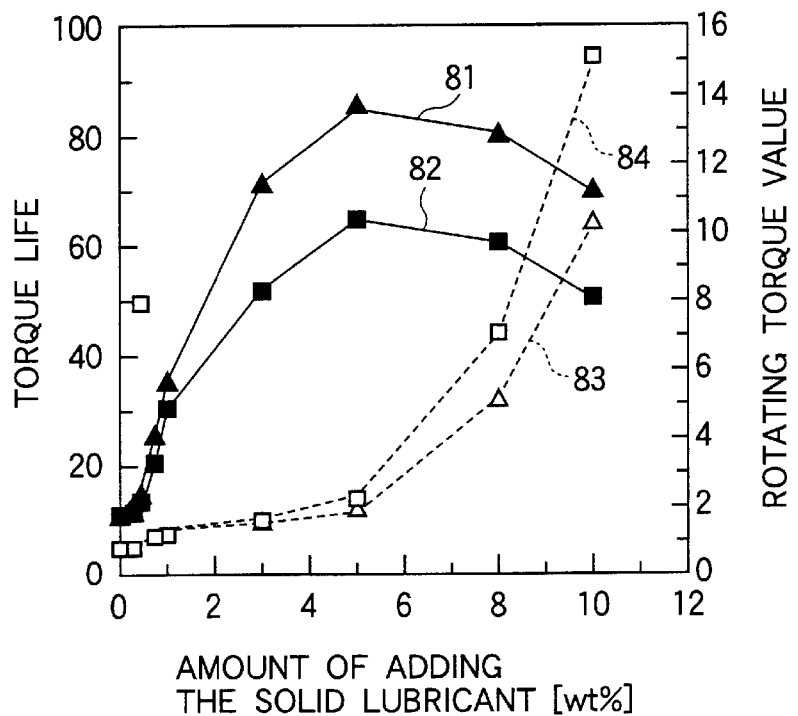
FIG. 8 is a graph showing the relationship in the amount of adding the solid lubricant in the grease composition, the torque lives and the rotating torque values of the rolling elements.

Results are shown in FIG. 8. The curves 81 and 83 show the torque life and the rotating torque when the solid lubricant was the diamond ultra particle, and the curves 82 and 84 show the torque life and the rotating torque when the solid lubricant was the layer-like mineral powder. In the graph of FIG. 8, the rotating torque and the torque life of the vertical axis are the relative values when the value of the Comparative Example 9 of Table 7 is 1.

From the graph of FIG. 8, it is seen in each of the solid lubricants that as increasing the charging amount of the solid lubricant, the torque life of the rolling bearing is improved, but the rotating torque value rapidly increases when the charging amount of the grease composition exceeds 5.0 vol %.

As the torque life is long and the rotating torque is low if the present rolling bearing is used to copiers, laser beam printers, facsimile, or the office machinery of their compound machinery, it is much contributes to the curtailment of the energy of the office machinery.

By the way, the oil separation of the grease composition has the relativity with the amount of the thickening agent (the solid fluorinated polymer) in the grease composition, and the more the thickening agent, the smaller the oil separation.

Explanation will be made to the test results of the relation between the amount of the thickening agent and the oil separation in the grease composition.

The oil separation was measured and calculated by JIS K2220.5.7.

Testing temperatures: 200° C.

Atmosphere: Atmospheric air

Time: 24 hours

The base oil of the grease composition: Liquid fluorinated polymer

Kinematic viscosity at 40° C.: 400 $mm^2$/sec

The thickening agent in the grease composition: Solid fluorinated polymer

Average diameter: 0.1 μm

Figure 9:
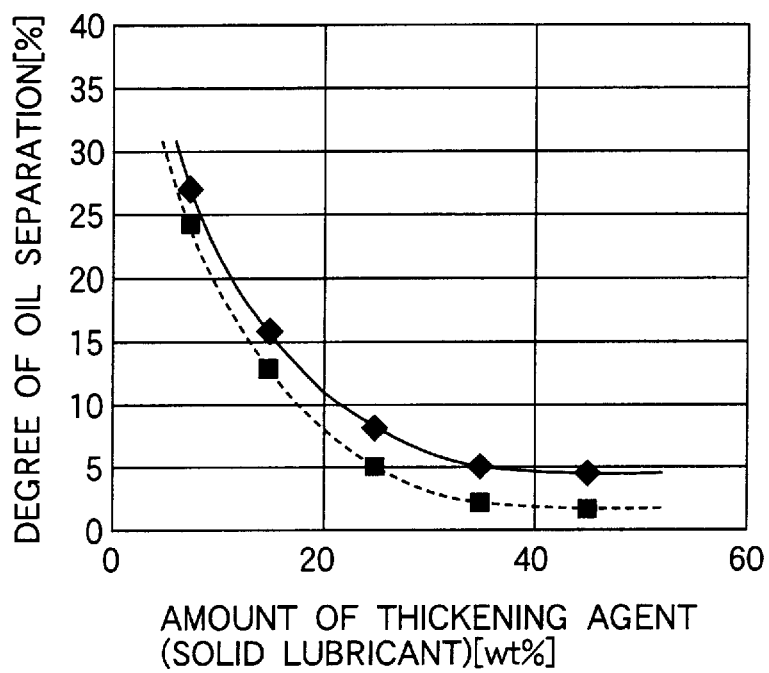
FIG. 9 is a graph showing the relationship between the amount of the thickening agent in the grease composition and the degree of oil separation in the grease composition.

The test results are shown with the solid line (♦ mark) in the graph of FIG. 9. As seen from the graph, if the thickening agent is less than 15 wt %, the oil separation of the grease composition exceeds 16%. So, the base oil is easy to leak from the rolling bearing, inconveniences might occur as lowering the life of the rolling bearing. Further, preferably, the more the thickening agent, the smaller the oil separation, but the more the thickening agent, the higher the rotating torque of the rolling bearing, causing to heat. If using the thickening agent more than 35 wt %, the effect making the oil separation small is not heightened so much. From these results, the amount of the thickening agent in the grease composition is preferably 15 to 35 wt %, so that the oil separation in the grease composition can be 16.0% or lower.

The dotted line (■ mark) in FIG. 9 shows the test results where the similar tests were performed by using the above mentioned grease composition added with the solid lubricant (mica based layer-like mineral powder) of 3.0 wt %. It is seen that if the solid lubricant is further added, the oil separation trends to be smaller, but as the addition amount is small, the amount of the thickening agent governs the oil separation.

[Second Embodiment]

Explanation will be made to the measured results of the torque lives when the rolling apparatus (the rolling bearing) of the invention in the neighborhood of the heat source. The composition of the rolling bearing is almost the same as that of the rolling bearing 1 in FIG. 1, and explanation therefor will be omitted (in the following explanation, reference numerals used in FIG. 1 will be used).

The evaluating method of the torque lives by the rotation test is almost the same as in the Examples 1 to 33 of the above mentioned first embodiment.

To the rolling bearings of the Examples 48 to 57 and the Comparative Examples 11 to 13, the deep groove ball bearings for rotating the inner rings made by Nippon Seiko Kabushiki Kaisha (Type No.: 6907, inner diameter: 35 mm, outer diameter: 55 mm, width: 10 mm) were used, the grease composition was charged around 3 g in the insides, and rotating tests were carried out under later mentioned conditions by means of a bearing rotation tester made by Nippon Seiko Kabushiki Kaisha.

While the temperature of the outer ring 3 of the rolling bearing was being measured by such as a thermocouple, the housing 10 securing the outer ring 3 was heated by the heater, and after the outer circumference of the outer ring 3 reached to a predetermined temperature, the rotation test was started. In reference to the bearing torque at the initial period of the test, evaluations were made as lives of the rolling bearings at points where the torque values rapidly increased.

The testing conditions are as follows.
Testing temperatures: 100, 150, 200° C.
Atmosphere: Atmospheric air
Rotation speed: 200 rpm
Axial load: 980 N The material qualities of the inner and outer rings and the rolling elements, the content of the grease composition (the thickening agent contained in the grease composition: 3 wt %) and the test results are shown in Table 8. The used base oils and thickening agents are the same as in the first embodiment, and explanation therefor will be omitted. The torque lives of the rolling bearings in the respective Examples are shown with the relative values when the torque lives of the corresponding Comparative Examples are 1 as described in the marginal space of Table 8.

composing the outer ring 3, and the vertical axis shows the torque life of the rolling bearing. The curve 101 is data when the inner ring 2 and the rolling elements 4 were fabricated with SUJ2 (the heat conductivity: 50 W/m·K), and the curve 102 is data when the rolling elements 4 and the outer ring 3 were fabricated with the same materials, and the inner ring 2 was made of SUJ2. The torque lives shown in the graph are shown with the relative values when the torque life of the rolling bearing whose inner ring 2, outer ring 3 and rolling elements were formed with SUJ2 is 1.

Figure 10:
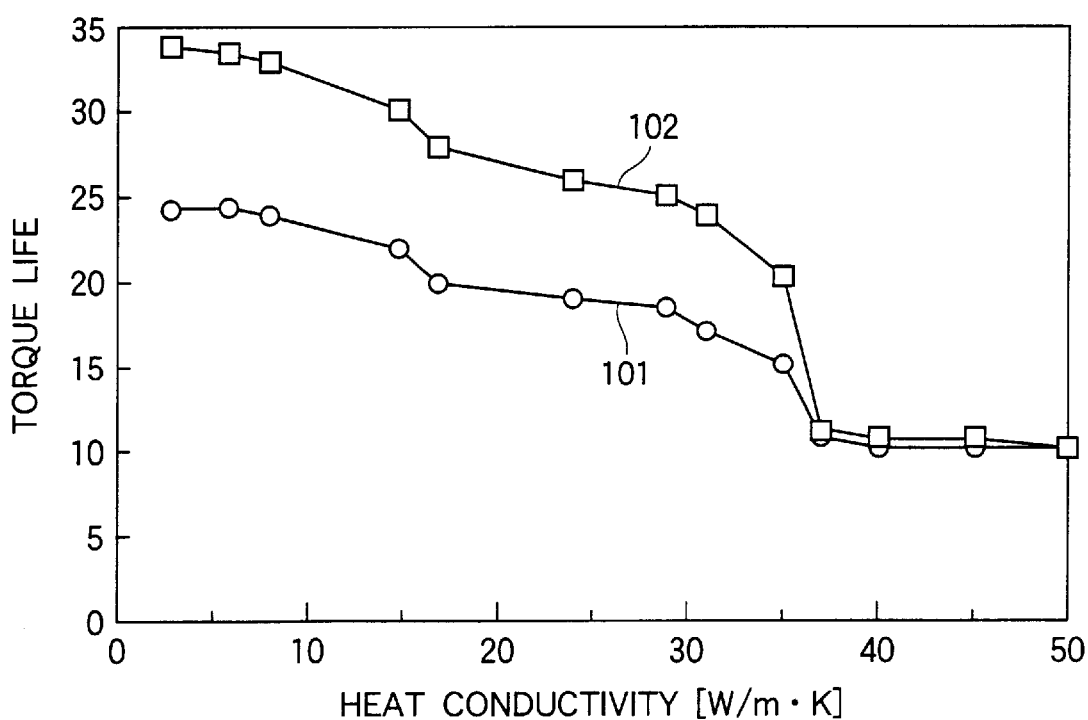
FIG. 10 is a graph showing the relationship between the heat conductivity of the material for composing the outer ring and the torque lives of the rolling bearings.

From the graphs in FIG. 10, it is seen that the lower the heat conductivity of the material composing the outer ring 3, the more excellent the torque life, and the heat conductivity is preferably 35 W/m·K or lower, and if the rolling elements 4 together with the outer ring 3 are composed with the material of the low heat conductivity, the torque life is superior.

Thus, the rolling bearing of the present embodiment has the long life even under the conditions that the heat source is located outside (nearly) of the rolling bearing, and the heat is conducted via the housing 10 or the shaft 9 to heighten the temperature of the rolling bearing.

The present embodiment shows one example of the invention, and the invention is not limited to the present embodiment. For example, in the embodiment, the rolling bearing 1 is an inner ring rotating type, and maybe also an outer ring rotating type. Further, the outer ring 3 of the inner

TABLE 8

|  | Inner ring A/B | Outer ring A/B | Rolling elements A/B | Grease compositions | Testing Temp. | Torque life |
|---|---|---|---|---|---|---|
| Ex. 48 | SUJ2/50 | SUS440C/24 | SUJ2/50 | Urea-grease | 100 | 5 |
| Ex. 49 | SUJ2/50 | SUS440C/24 | SUS440C/24 | Urea-grease | 100 | 8 |
| Com. 11 | SUJ2/50 | SUJ2/50 | SUJ2/50 | Urea-grease | 100 | 1 |
| Ex. 50 | SUJ2/50 | SUS440C/24 | SUJ2/50 | Silicon grease | 150 | 3 |
| Ex. 51 | SUJ2/50 | SUS440C/24 | SUS440C/24 | Silicon grease + Mineral | 150 | 15 |
| Com. 12 | SUJ2/50 | SUJ2/50 | SUJ2/50 | Silicon grease | 150 | 1 |
| Ex. 52 | SUJ2/50 | SUS440C/24 | SUJ2/50 | Fluoride grease 1 | 200 | 5 |
| Ex. 53 | SUJ2/50 | SUS440C/24 | SUS440C/24 | Fluoride grease 3 + Mineral | 200 | 26 |
| Ex. 54 | SUJ2/50 | $Si_3N_4$/21 | SUS440C/24 | Fluoride grease 3 + Mineral | 200 | 23 |
| Ex. 55 | SUJ2/50 | $Si_3N_4$/17 | $Si_3N_4$/17 | Fluoride grease 3 + Mineral | 200 | 26 |
| Ex. 56 | SUJ2/50 | $ZrO_2$/3 | SUS440C/24 | Fluoride grease 3 + Mineral | 200 | 28 |
| Ex. 57 | SUS440C/24 | $Al_2O_3$/21 | $Al_2O_3$/21 | Fluoride grease 3 + Mineral | 200 | 26 |
| Com. 13 | SUJ2/50 | SUJ2/50 | SUJ2/50 | Fluoride grease 1 | 200 | 1 |

Ex.: Example
Com.: Comparative Example
A: Materials
B: Heat conductivity
1) The unit of heat conductivity is W/m · K and the unit of testing temperature is ° C.
2) "Mineral" in the column of the grease composition is meant by the layer mineral powder.
3) The torque life of Examples 48 and 49 is expressed with relative values when the torque of Comparative Example 11 is 1. Similarly, those of Examples 50 and 51 are expressed with relative values when the torque of Comparative Example 12 is 1, and those of Examples 52 to 57 are expressed with relative values when Comparative Example 13 is 1.

As is seen from Table 8, in each of the Examples, the torque life is largely improved with respect to each of the corresponding Comparative Examples.

Explanation will be made to the results of studying the relationship between the heat conductivity of the materials for composing the outer ring 3 and the torque lives of the rolling bearings.

The testing method is the same as in the rotation test, and explanation therefor will be omitted. But the testing temperature was 200° C., and the used grease compositions were the fluoride grease 3 added with the layer-like mineral powder in all of the rolling bearings.

The test results are shown in FIG. 10. The lateral axis of this graph shows the heat conductivity of the material for ring 2 and the outer ring 3 is the bearing ring nearer to the heat source, and reversely the inner ring 2 may be a bearing ring nearer to the heat source. In addition, in the present embodiment, as the example of the rolling apparatus, the explanation was made by exemplifying the rolling bearing, and of course another rolling apparatus such as a linear guide apparatus or a ball screw is available.

[Third Embodiment]

Explanation will be made to the rolling bearing for the fan motor being one embodiment of the inventive rolling bearing. The composition of the rolling bearing for the fan motor is almost the same as that of the rolling bearing 1 in FIG. 1, and explanation therefor will be omitted (in the following explanation, reference numerals used in FIG. 1 will be used).

The rotation tests were performed on the Examples 58 to 68 and Comparative Examples 14 to 16 where the rolling elements 4 and the out rings were made of the materials shown in Table 9, and the deep groove ball bearings (outer diameter: 22 mm, inner diameter: 8 mm, width: 7 mm, and diameter of the rolling element 4: 3.969 mm (5/32 inch) for evaluating the heat conductivity and the acoustic characteristic of the bearings.

In the bearings of the Examples 60 to 64, the rolling elements 4 are formed with the same silicon nitride sintered substances, and the radii of curvature in the raceway surfaces of the outer rings 3 are 56, 53, 60, 51 and 62%, respectively. The radius of curvature can be selected in the range of 50 to 65% of the diameter of the rolling element, taking the torque and the heating value of the bearing into consideration, and for the above mentioned reason, particu-

TABLE 9

|         | Rolling elements |    |     |           | Outer ring | Inner ring |
|---------|------------------|----|-----|-----------|------------|------------|
|         | Materials | B | C | Flexural strength | Materials | Radius of curvature of raceway surface | Radius of curvature of raceway surface |
| Ex. 58  | Silicon nitride | 30 | 0.2 | 1000 | SUJ2 | 56 | 51 |
| Ex. 59  | Silicon nitride | 35 | 0.1 | 1100 | SUJ2 | 56 | 51 |
| Ex. 60  | Silicon nitride | 20 | 0.4 | 900 | SUJ2 | 56 | 51 |
| Ex. 61  | Silicon nitride | 20 | 0.4 | 900 | SUJ2 | 53 | 51 |
| Ex. 62  | Silicon nitride | 20 | 0.4 | 900 | SUJ2 | 60 | 51 |
| Ex. 63  | Silicon nitride | 20 | 0.4 | 900 | SUJ2 | 51 | 51 |
| Ex. 64  | Silicon nitride | 20 | 0.4 | 900 | SUJ2 | 62 | 51 |
| Ex. 65  | Zirconia | 3 | 0.1 | 1300 | SUJ2 | 56 | 51 |
| Ex. 66  | Zirconia | 3 | 0.5 | 1000 | SUJ2 | 56 | 51 |
| Ex. 67  | Zirconia · alumina | 6 | 0.1 | 1900 | SUJ2 | 56 | 51 |
| Ex. 68  | Silicon nitride | 20 | 0.4 | 900 | SUS440C | 56 | 51 |
| Com. 14 | SUJ2 | 46 | — | — | SUJ2 | 56 | 51 |
| Com. 15 | SUJ2 | 46 | — | — | SUJ2 | 51 | 51 |
| Com. 16 | SUJ2 | 46 | — | — | SUJ2 | 62 | 51 |

Ex.: Example
Com.: Comparative Example
B: Heat conductivity
C: Rate of air hole
1) The unit of heat conductivity is W/m · K and the unit of rate of air hole is % (per 0.1 mm$^2$), and the unit of the flexural strength is MPa. The radius of curvature in the raceway surface is ratio when the diameter of the rolling element is 100, and the unit is %.

Explanation will be made to the respective bearings of the Examples and the Comparative Examples.

In the Examples 58 and 59, the rolling elements 4 are respectively fabricated with the pressurized and sintered silicon nitrides of the heat conductivity being around 30 W/m·K and 35 W/m·K. In the Examples 60 to 64, the rolling elements 4 are fabricated with the silicon nitrides sintered at ordinary pressure of the heat conductivity being around 20 W/m·K.

Each of these silicon nitrides has high strength as the ratio of the width and the length (aspect ratio) is 2 or higher in more than 90% of all crystal grains. This silicon nitride may be added, as sintering assistants defining an upper limit of 20 wt % of all sintered substances, with one kind or more selected from metallic oxides such as $Al_2O_3$, MgO or CeO, or rare earth oxides such as $Y_2O_3$, $YB_2O_3$, $La_2O_3$.

As the silicon nitrides used in the Examples 60 to 64 are the materials sintered at ordinary pressure, appropriate air holes of around 0.4% in the area rate exist inside. Such silicon nitrides are preferable, since the heat conductivity is less to occur (the heat conductivity is lower) owing to working of the air holes. In particular, if the abundance of the air holes is 0.3 to 15% in the area rate per 0.1 mm$^2$ and the size of the air holes is 0.5 to 40 μm in diameter of the corresponding circle, preferably the heat conductivity can be effectively checked and the strength of blank materials can be maintained.

larly preferable is the range of more than 52% to 60% of the diameter of the rolling elements in the Examples 60 to 62.

In the Examples 65 and 66, the rolling elements 4 are composed with zirconia, and the Example 65 is the pressurized sintered zirconia, while the Example 66 is the zirconis sintered at ordinary pressure. The heat conductivity of each example is around 3 W/m·K.

In them, the cubic system being a high temperature phase is a main phase, and a so-called partially stabilized zirconia dispersed with zirconia of tetragonal system and monocline system.

In these zirconias, $Y_2O_3$ of several mol % is added for stabilizing crystal phase, and no problem occurs if MgO or CeO are used as stabilizing agents. If crystal grains of the main phase are refined, heat distraction is activated at grain boundaries, so that the heat conductivity is still further suppressed. If refining grains, as propagation of destructive cracks is checked, the material strength can be increased. Diameter of refined grain is preferably 1.0 μm or lower.

The Example 67 is that the rolling elements 4 are composed with the material added with alumina of around 30% for zirconia, and the material added with alumina to zirconia is improved in the heat stability, and the heat conductivity is low as 6 W/m·K and flexural strength is high as 1900 MPa.

The Example 68 is that the rolling elements 4 are composed with silicon nitride sintered at ordinary pressure being the same as in the Examples 60 to 64. The radii of curvature in the rolling surfaces of the outer and inner rings are respectively 56% and 51% of the diameter of the rolling elements. The outer ring being the stationary side (the stationary ring) is formed with SUS440 of the heat conductivity being 24 W/m·K.

The Comparative Example 14 is that the rolling elements 4 are composed with the bearing steel (SUJ2) of the high heat conductivity. The Comparative Examples 15 and 16 are that the rolling elements 4 are composed with the same bearing steel as that of the Comparative Example 14, and the radii of curvature of the raceway surfaces of the outer rings 3 are 51% and 62% of the diameter of the rolling elements 3.

The holder 5 (not shown in FIG. 11) is made of synthetic resin, and may be made of metal. For checking the heat conduction between the outer and inner rings through the holder 5, the synthetic resin made holder is desirable.

As sorts of resins, it is preferable that glass fiber is compounded in polyamide (PA) resin for heightening the strength. For serving the bearing at higher temperature, instead of polyamide, resins of groups of polyphenylene sulfide (PPS), polyether ether ketone (PEEK), or polyimide (PI) maybe suitably used.

In regard to sorts of the greases to be used, no limitation is especially provided, and in particular if using the base oil of a composite oil group and using the thickening agent of lithium soap group, so that a degree of mixing preparation ranges 220 to 300, and a stabilized lubrication characteristic can be desirably maintained in a broad temperature range.

The rotation testing methods will be explained referring to FIG. 11.

Figure 11:
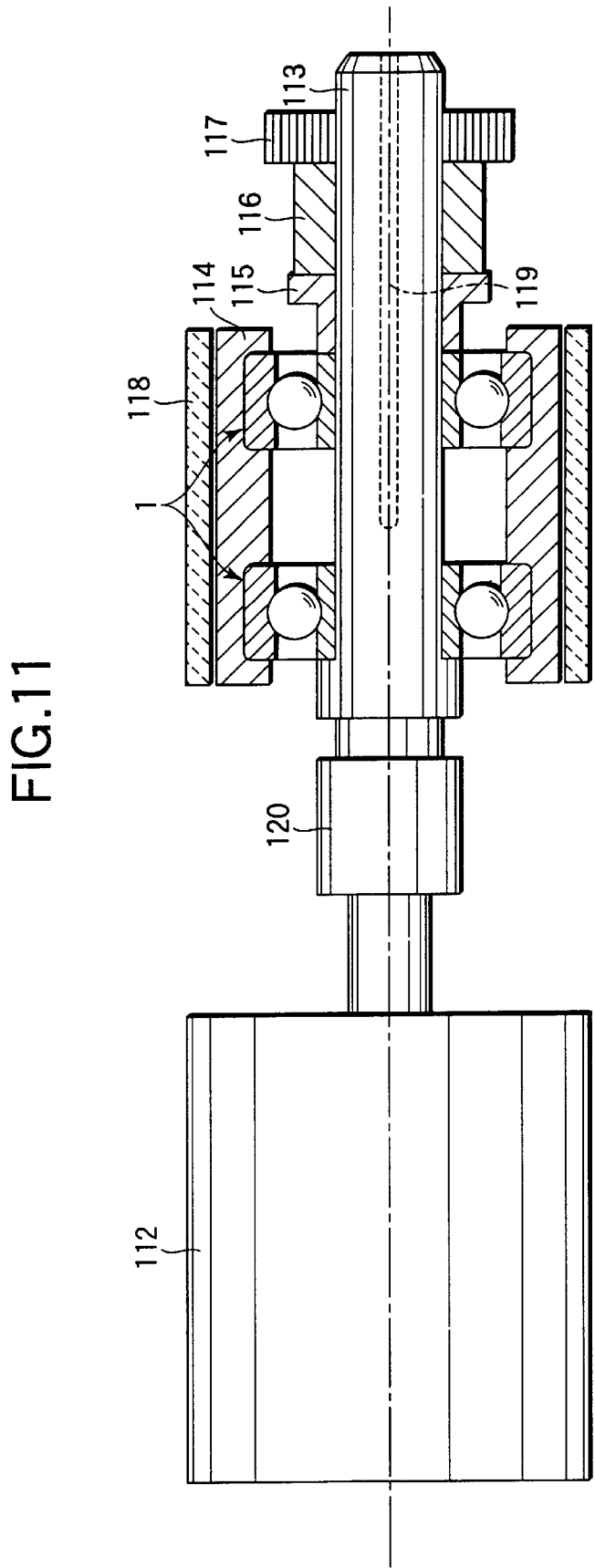
FIG. 11 shows a cross sectional view for explaining the evaluating method of the rolling bearing for the fan motor and the structure of the testing machine.

The used test machine is an inner ring rotation type as shown in FIG. 11. For realizing tests which would reflect problems proper to the rolling bearing for the fan motor, a channel was set so that the heat would be conducted in order of the rolling elements 4, the inner ring 2 and the shaft 113 from the outer ring 3.

One couple of two testing bearings 1 are furnished between the shaft 113 to be driven by the motor 112 and the housing 114.

The testing bearing 1 is then effected with pre-load through a spacer 115, a spring 116 and a nut 117.

The housing is equipped on the outer circumference with a heater 118 for heating the outer ring 3 similarly to heat generated by a stator coil when driving the fan motor. For the heat to be transmitted from the outer ring 3 to the shaft 113, a thermocouple is inserted in a hole 119 for measuring the temperature of the heat.

If the heat generated at the motor 112 is completed to transmit to the shaft 113, the heat from the outer ring 3 to the shaft 113 cannot be correctly measured, and therefore, a coupling 120 made of stainless steel is interposed between the shaft 113 and the motor 112 for interrupting the heat transmission from the motor, and both are connected by the coupling 120.

By using such a testing machine, the rotation test was practiced for evaluating the heat conductivity of the testing bearing 1 and the acoustic characteristic.

A test for evaluating the heat conductivity will be explained.

Under the following conditions, the testing bearing 1 was rotated for 30 minutes, and the temperature inside of the shaft was measured by the thermocouple inserted in the temperature measuring hole 119. The heat conductivity of the testing bearing 1 was evaluated through increasing rate of the temperature inside of the shaft before and after the rotation test. The increasing rate of the temperature inside of the shaft of the bearing was shown with the relative value when the increasing rate of the temperature inside of the shaft of the bearing in the Comparative Example 14 was 1.

Atmospheric temperature: Ordinary temperature
Pre-load: 29.4 N
Rotation number: 3000 rpm
Heater temperature: 100° C.

The test for evaluating the acoustic characteristics will be explained. The acoustic value of the bearing was measured after the bearing was rotated for 30 hours under the same condition as above, excepting that the pre-load was 88.2 N. The acoustic characteristic of the testing bearing 1 was evaluated by increasing rate of the acoustic value before and after the rotation tests. The increasing rate of the acoustic value of each bearing was shown with the relative value when the increasing rate of the bearing acoustic value in the Comparative Example 14 was 1.

Figure 12:
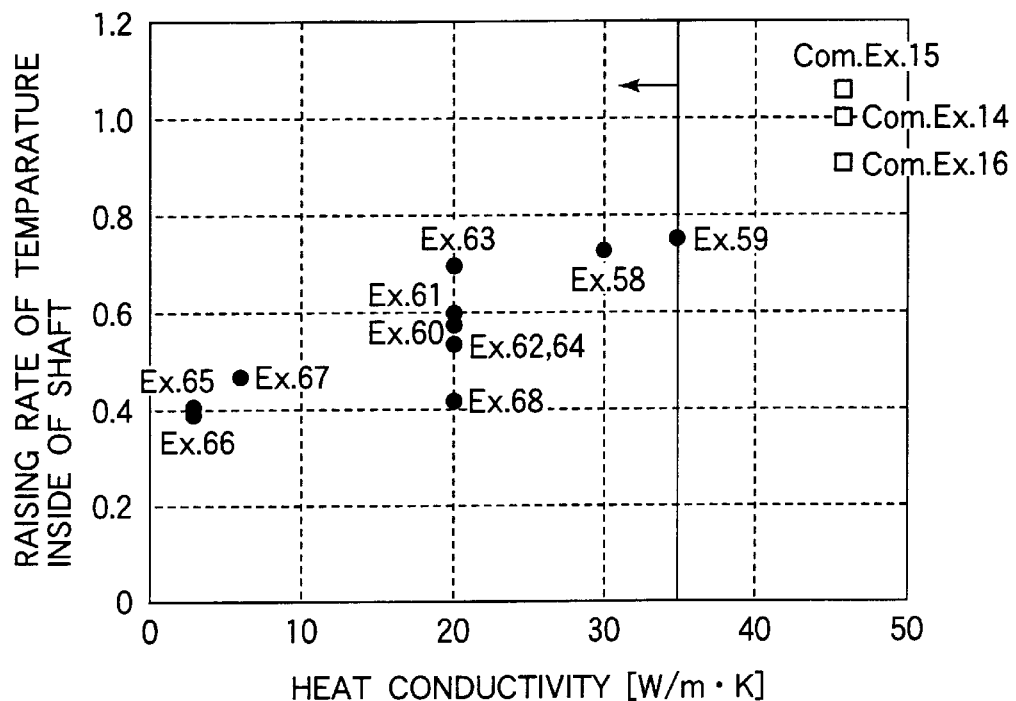
FIG. 12 is a graph showing the relationship between the heat conductivity of the material for composing the rolling elements and the rising rate of the temperature inside of the shaft.

The evaluated results of the heat conductivity of the testing bearing 1 will be explained, referring to the graph in FIG. 12. The vertical axis of the graph shows the rising rate of the temperature inside of the shaft, while the lateral axis shows the heat conductivity of the materials for composing the rolling elements 4.

The rising rates of the temperature inside of the shaft of the Examples 58 to 68 are below 80% in comparison with the Comparative Example 14, and it is seen that the heat conductivity of the bearing is small. The lower the heat conductivity of the material composing the rolling elements 4, the lower the rising rate of the temperature inside of the shaft.

Accordingly, if such a bearing is used as the rolling bearing for the fan motor, even if the fan motor is rotated at high speed and at high output, the transmission of the heat generated at the stator to the rotor side can be effectively suppressed. As a result, the rising of blowing temperature of the fan is restrained, so that the cooling effect of the fan is not hindered.

Figure 13:
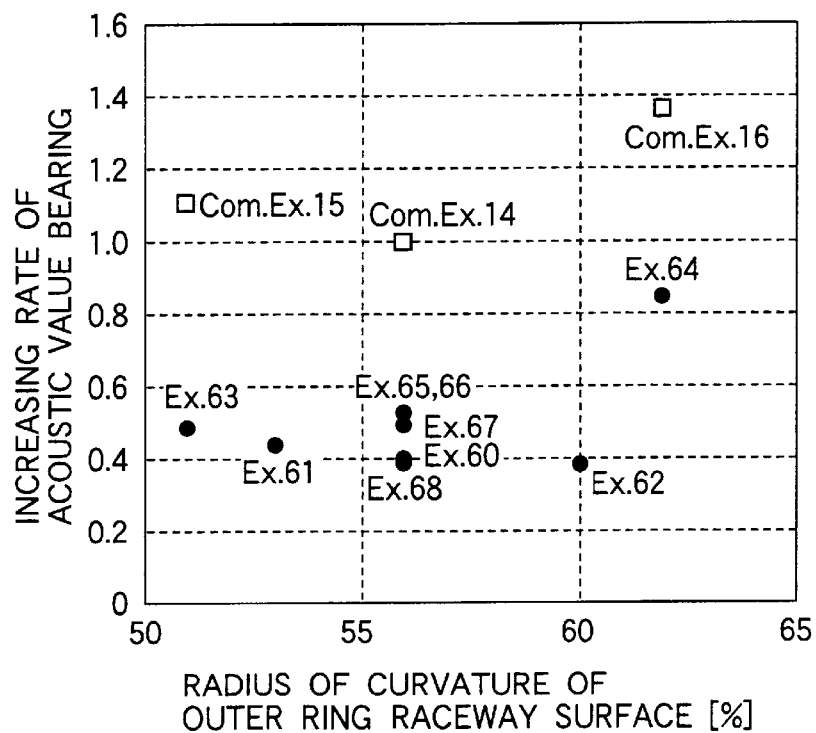
FIG. 13 is a graph showing the relationship between the radius of curvature in the raceway surface of the outer ring and the increasing rate of the acoustic value of the bearing.

The evaluated results of the acoustic characteristic of the testing bearing 1 will be explained, referring to the graph in FIG. 13. The vertical axis of the graph shows the increasing rate of the acoustic value of the bearing, while the lateral axis shows the ratio (the diameter of the rolling element 4 is 100) of the radius of curvature of the raceway surface of the outer ring 3 and the diameter of the rolling element 4.

Since the rolling elements 4 are fabricated with the ceramic material, fine seizure is restrained, and in comparison with the Comparative Example 14 fabricating the rolling elements 4 with the bearing steel, the increasing rate of the bearing acoustic value is below half. But, if the radius of curvature in the raceway surface of the outer ring 3 is large, the contacting area between the rolling elements 4 and the raceway surface is decreased, and although the heat conduction from the outer ring is restrained, the surface pressure is large, so that the raceway surface is easily injured to cause to increase the bearing acoustic value.

Reversely, if the radius of curvature in the raceway surface of the outer ring 3 is reduced, the contacting area between the outer ring 3 and the rolling elements 4 is large, so that the heat conduction from the outer ring 3 easily occur and in addition, a differential sliding amount is increased to heighten the increasing rate of the bearing acoustic value.

Thus, the radius of curvature in the raceway surface of the outer ring (the side of the stationary ring) is preferably 53 to 60% for the diameter of the rolling elements 4.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As mentioned above, the rolling apparatus of the invention is small in the heat conductivity, and so if using nearly to the heat source, the rising temperature of the rolling apparatus is effectively suppressed. Since deterioration owing to high temperature of the lubricant charged inside of the rolling apparatus is restrained, the rolling apparatus of the invention is long in serving life.

As the heat is insulated by the rolling elements between the movable member and the supporter, even if the fan motor is rotated at high speed and at high output, the transmission of the heat generated at the stator to the rotor side can be effectively suppressed. As a result, the rising of blowing temperature of the fan is restrained, so that the cooling effect of the fan is not hindered.

In addition, the rising of the temperature of the rolling bearing itself is checked, so that the lubrication is less to be bad, and the rolling bearing is excellent in quietness for a long period of service.

If the inventive rolling bearing is used to copiers, laser beam printers, facsimile, or the office machinery of their compound machinery, in particular to the heat roll of the toner fixing part, it is possible to reduce the escape of the heat outside through the rolling bearing from the heat roll at high temperature, and curtail the energy of the office machinery.

What is claimed is:

1. A rolling apparatus to be installed in the vicinity of a heat source, comprising:
   a movable member enabling rotation or linear motion;
   a supporter movably supporting said movable member; and
   a plurality of rolling elements disposed between said movable member and said supporter and rolled in company with the movement of said movable member,
   wherein a grease is charged in a space enclosed with said movable member and a portion of said supporter which opposes the movable member, the amount of the charged grease is 8 to 23 vol % of the capacity of said space,
   further wherein the amount of a solid lubricant in said grease is 0.5 to 5.0 wt %, and
   wherein the solid lubricant is selected from at least one kind of layer-like substance powder and ultra fine particle, and said layer-like substance powder is layer-like mineral powder or powder of layer-like substance having cleavage, composing elements of which layer-like substance are substantially non-metallic elements.

2. A rolling apparatus as set forth in claim 1, wherein a thickening agent contained in the composition of the charged grease is 15 to 35 wt %.

3. A rolling apparatus as set forth in claim 1 wherein viscosity of a base oil of the charged grease is 200 to 700 mm$^2$/sec at 40° C.

4. A rolling apparatus to be installed in the vicinity of a heat source, comprising:
   a movable member enabling rotation or linear motion;
   a supporter movably supporting said movable member; and
   a plurality of rolling elements disposed between said movable member and said supporter and rolled in company with the movement of said movable member,
   wherein heat conductivity of the rolling elements are 3 W/m·K or more,
   wherein said rolling apparatus satisfies one of following first to third conditions (1)–(3), including,
   (1) said first condition where at least the rolling elements are fabricated with the material of the heat conductivity being 40 W/m·K or less,
   (2) said second condition where either of the movable elements and the supporter which either is nearer to the heat source is fabricated with the material of the heat conductivity being 40 W/m·K or less, and
   (3) said third condition that either of the movable elements and the supporter which either is nearer to the heat source, and the rolling elements are fabricated with the material of the heat conductivity being 40 W/m·K or less, and
   further wherein grease is charged in a space enclosed with the movable member and the portion of the supporter opposite to the movable member, said grease comprising a thickening agent, said thickening agent is selected from at least one kind of layer-like substance powder and ultra fine particle, and said layer-like substance powder is layer-like mineral powder or powder of layer-like substance having cleavage, composing elements of which layer-like substance are substantially non-metallic elements.

5. The rolling apparatus as set forth in claim 4, wherein the heat conductivity is 35 W/m·K or less.

6. A rolling apparatus to be installed in the vicinity of a heat source, comprising:
   a movable member enabling rotation or linear motion;
   a supporter movably supporting said movable member; and
   a plurality of rolling elements disposed between said movable member and said supporter and rolled in company with the movement of said movable member,
   wherein said rolling apparatus satisfies one of following first to third conditions (1)–(3), including,
   (1) said first condition where at least the rolling elements are fabricated with a material of a heat conductivity being 40 W/m·K or less,
   (2) said second condition where either of the movable elements and the supporter which either is nearer to the heat source is fabricated with a material of a heat conductivity being 40 W/m·K or less, and
   (3) said third condition that either of the movable elements and the supporter which either is nearer to the heat source, and the rolling elements are fabricated with a material of a heat conductivity being 40 W/m·K or less, and
   further wherein said movable member and said supporter are made of a metal, and the ratio of the heat conductivity of the material composing the rolling elements is K1/K2≦0.8, where K1: the rolling elements, and K2: the heat conductivity of the movable member and the supporter.

7. A rolling apparatus to be installed in the vicinity of a heat source, comprising:
   a movable member enabling rotation or linear motion;
   a supporter movably supporting said movable member; and
   a plurality of rolling elements disposed between said movable member and said supporter and rolled in company with the movement of said movable member, wherein said rolling apparatus satisfies one of following first to third conditions (1)–(3), including,
  (1) said first condition where at least the rolling elements are fabricated with a material of a heat conductivity being 35 W/m·K or less,
  (2) said second condition where either of the movable elements and the supporter which either is nearer to the heat source is fabricated with a material of a heat conductivity being 35 W/m·K or less, and
  (3) said third condition that either of the movable elements and the supporter which either is nearer to the heat source, and the rolling elements are fabricated with a material of a heat conductivity being 35 W/m·K or less, and
further wherein said movable member and said supporter are made of a metal, and the ratio of the heat conductivity of the material composing the rolling elements is K1/K2≦0.8, where K1: the rolling elements, and K2: the heat conductivity of the movable member and the supporter.

8. The rolling apparatus as set forth in any one of claims 4 to 7, wherein an amount of a thickening agent in the grease is 0.5 to 15 wt %.

9. A rolling apparatus to be installed in the vicinity of a heat source, comprising:
  a movable member enabling rotation or linear motion;
  a supporter movably supporting said movable member; and
  a plurality of rolling elements disposed between said movable member and said supporter and rolled in company with the movement of said movable member,
wherein said rolling apparatus satisfies one of following first to third conditions (1)–(3), including,
  (1) said first condition where at least the rolling elements are fabricated with a material of a heat conductivity being 40 W/m·K or less,
  (2) said second condition where either of the movable elements and the supporter which either is nearer to the heat source is fabricated with a material of a heat conductivity being 40 W/m·K or less, and
  (3) said third condition that either of the movable elements and the supporter which either is nearer to the heat source, and the rolling elements are fabricated with a material of a heat conductivity being 40 W/m·K or less,
wherein the grease is charged in a space enclosed with the movable member and the portion of the supporter opposite to the movable member, and an amount of a thickening agent in the grease is 0.5 to 15 wt %,
wherein the thickening agent is selected from at least one kind of layer-like substance powder and ultra fine particle, and
further wherein said layer-like substance powder is layer-like mineral powder or powder of layer-like substance having cleavage, composing elements of which layer-like substance are substantially non-metallic elements.

* * * * *